United States Patent
Sugita et al.

(10) Patent No.: US 9,041,678 B2
(45) Date of Patent: May 26, 2015

(54) INPUT DEVICE, CONTACT POSITION DETECTION METHOD, AND DISPLAY DEVICE PROVIDED WITH INPUT DEVICE

(75) Inventors: Yasuhiro Sugita, Osaka (JP); Kazutoshi Kida, Osaka (JP); Yuhji Yashiro, Osaka (JP); Shinji Yamagishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 90 days.

(21) Appl. No.: 14/113,879

(22) PCT Filed: Apr. 20, 2012

(86) PCT No.: PCT/JP2012/060669
§ 371 (c)(1),
(2), (4) Date: Oct. 25, 2013

(87) PCT Pub. No.: WO2012/147634
PCT Pub. Date: Nov. 1, 2012

(65) Prior Publication Data
US 2014/0049705 A1  Feb. 20, 2014

(30) Foreign Application Priority Data
Apr. 28, 2011 (JP) ................................. 2011-100945

(51) Int. Cl.
*G06F 3/041* (2006.01)
*G06F 3/044* (2006.01)

(52) U.S. Cl.
CPC .............. *G06F 3/041* (2013.01); *G06F 3/0416* (2013.01); *G06F 3/044* (2013.01)

(58) Field of Classification Search
CPC ... G06F 3/03547; G06F 3/041; G06F 3/0412; G06F 3/0414; G06F 3/046; G06F 3/047; G06F 2203/041; G06F 3/044; G06F 3/045; G06F 2203/04112; G06F 3/0428
USPC ........................................................ 345/173
See application file for complete search history.

(56) References Cited

U.S. PATENT DOCUMENTS

| 6,452,514 | B1 | 9/2002 | Philipp |
| 7,812,827 | B2 | 10/2010 | Hotelling et al. |
| 2010/0085324 | A1 | 4/2010 | Noguchi et al. |

FOREIGN PATENT DOCUMENTS

JP  2010-092275 A  4/2010

OTHER PUBLICATIONS

Official Communication issued in International Patent Application No. PCT/JP2012/060669, mailed on Jul. 17, 2012.

*Primary Examiner* — Premal Patel
(74) *Attorney, Agent, or Firm* — Keating & Bennett, LLP

(57) ABSTRACT

Detection accuracy is improved without reducing a driving frequency and an S/N ratio.
Driving electrodes (DL(j−2) and DL(j−1)) of a driving electrode group (GDL(i)) overlap a driving electrode group GDL (i−1), and driving electrodes (DL(j+1) and DL(j+2)) thereof overlap a driving electrode group GDL(i+1). A first changeover terminal of a changeover switch (SW(i)) is connected to a wire to which a burst clock signal (BCK) is given, and a ground potential is given to a second changeover terminal thereof. A common terminal of the changeover switch (SW(i)) is connected to a driving electrode (DL(j)) located at a center of the driving electrode group (GDL(i)), is connected to the driving electrodes (DL(j−1) to DL(j−3)), respectively, via one to three resistive elements (Rd), and is connected to the driving electrodes (DL(j+1) to DL(j+3)), respectively, via one to three resistive elements (Rd).

14 Claims, 30 Drawing Sheets

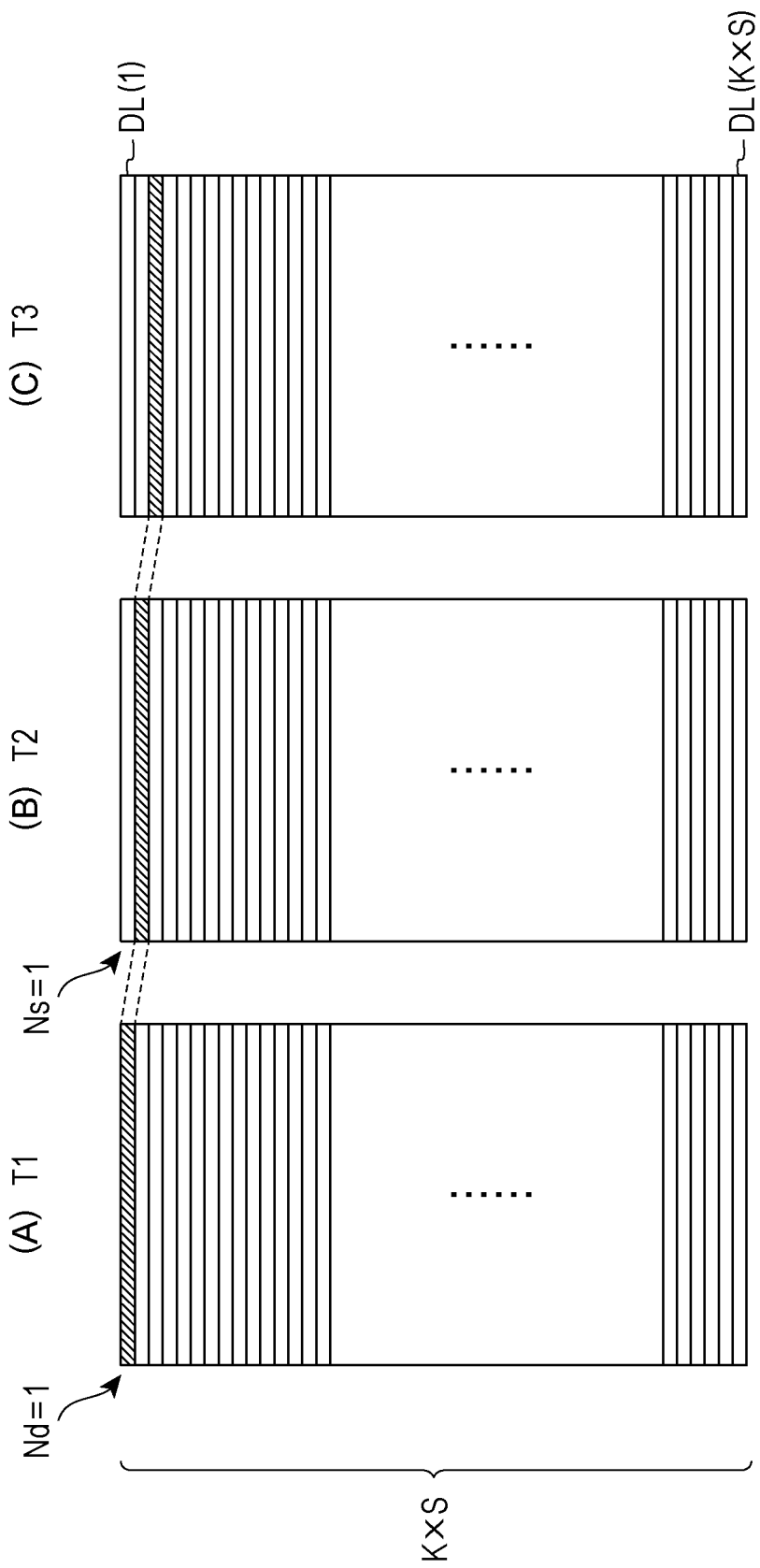

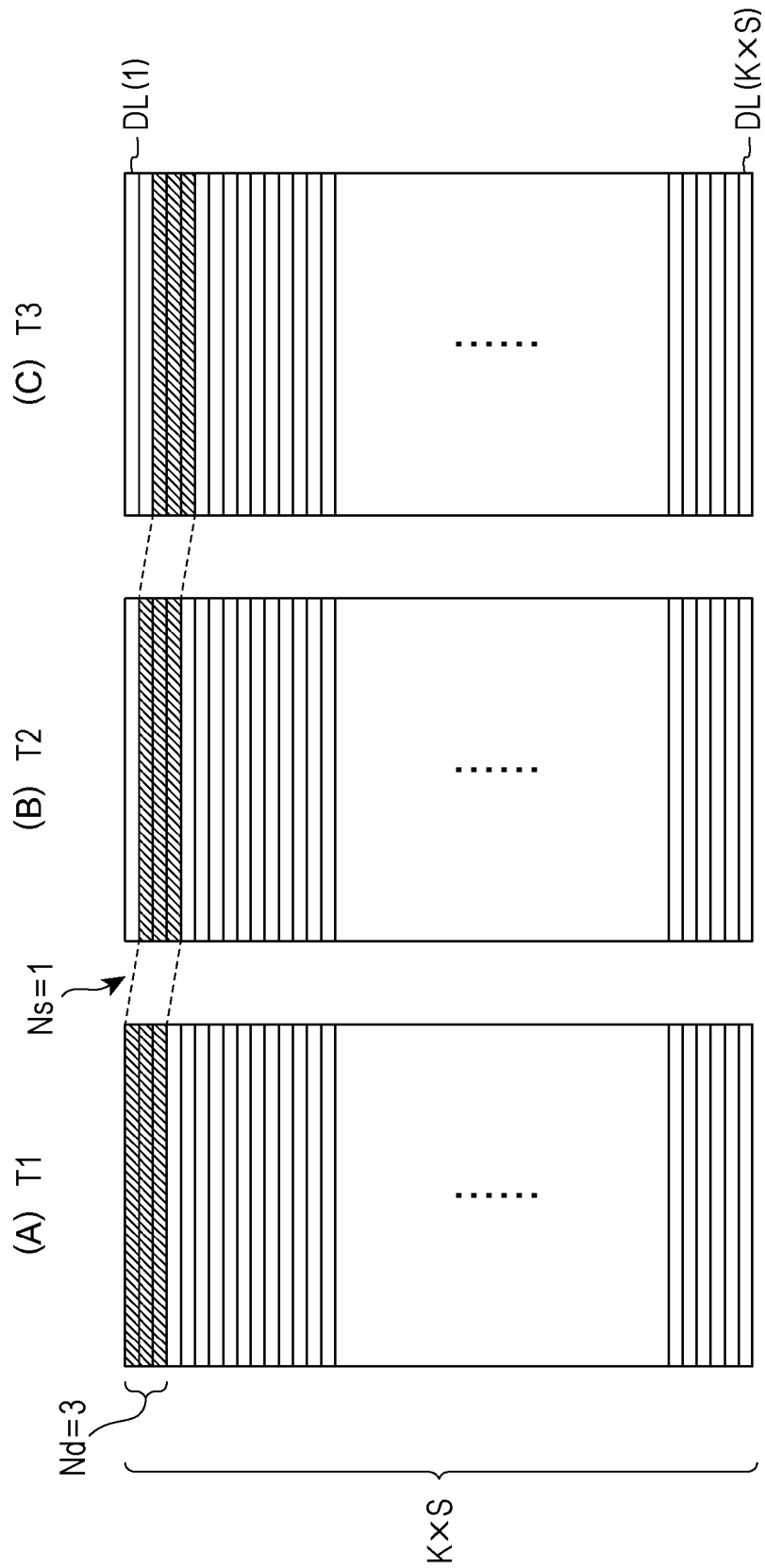

INPUT DEVICE, CONTACT POSITION DETECTION METHOD, AND DISPLAY DEVICE PROVIDED WITH INPUT DEVICE

TECHNICAL FIELD

The present invention relates to an input device, a contact position detection method, and a display device provided with the input device, and particularly to a touch input device using a capacitive touch panel, a contact position detection method of detecting a contact position of an object with the touch panel, and a display device provided with the touch input device.

BACKGROUND ART

In the related art, there is a capacitive touch panel which detects a position of an object such as a finger of an operator or a pen on the basis of a variation in a capacitance. A touch input device using this capacitive touch panel is generally used in combination with a display device such as a liquid crystal display.

The touch input device generally includes a touch panel provided with a plurality of driving electrodes and a plurality of detection electrodes forming capacitances with the respective driving electrodes, a driving circuit connected to the plurality of driving electrodes, and a detection circuit connected to the detection electrodes. The plurality of driving electrodes are sequentially driven by the driving circuit, and a sampling capacitor in the detection circuit is charged by electric charges which are induced in the detection electrodes. A position of an object is detected based on a comparison result between a voltage held in the sampling capacitor and a predetermined threshold voltage.

In the above-described touch input device, if the area (width) of the driving electrode is small, the number of driving electrodes which can be disposed on the touch panel increases, and thus a position of an object is finely detected, but, on the other hand, a variation in a potential output from the detection electrode is reduced. In contrast, if the area (width) of the driving electrode is large, a variation in a potential output from the detection electrode increases, but, on the other hand, the number of driving electrodes which can be disposed on the touch panel is reduced, and thus a position of an object cannot be finely detected. In other words, there is a trade-off in relation between an S/N ratio in detecting a potential variation of the detection electrode and detection accuracy (which refers to a resolution of position detection in a direction in which the driving electrodes are arranged). In addition, hereinafter, there are cases where a description is made assuming that a dimension of the area of the driving electrode is the same as a dimension of the width of the driving electrode.

In relation to the present invention, PTL 1 discloses a touch input device in which m driving electrodes with a reduced width are driven together, and (m−1) driving electrodes are made to overlap each other among the m driving electrodes which are driven in continuous selection periods. Accordingly, when a position of an object such as a finger with the relatively large area is detected, it is possible to improve detection accuracy and to suppress an S/N ratio from being reduced.

CITATION LIST

Patent Literature

PTL 1: Japanese Unexamined Patent Application Publication No. 2010-92275
PTL 2: Specification of U.S. Pat. No. 6,452,514
PTL 3: Specification of U.S. Pat. No. 7,812,827

SUMMARY OF INVENTION

Technical Problem

However, in the touch input device disclosed PTL 1, the driving electrodes are required to be selected and be driven for the number of times corresponding to a total number of the driving electrodes within one vertical scanning period (which refers to time required to drive the driving electrodes of one end driving electrode to the other end driving electrode). In other words, as the width of the driving electrode becomes smaller, a driving frequency decreases (one vertical scanning period is lengthened). The decrease in the driving frequency indicates that an operation of detecting a position of an object is slow. In addition, if the driving frequency is made not to be reduced, charging of the sampling capacitor is not sufficiently performed, and thus the S/N ratio is reduced.

Therefore, an object of the present invention is to provide an input device capable of improving detection accuracy without reducing a driving frequency and an S/N ratio. In addition, another object of the present invention is to provide a method of detecting a contact position of an object with a touch panel, capable of improving detection accuracy without reducing a driving frequency and an S/N ratio. Further, still another object of the present invention is to provide a display device of the input device capable of improving detection accuracy without reducing a driving frequency and an S/N ratio.

Solution to Problem

According to a first aspect of the present invention, an input device includes a touch panel that includes M (where M is a natural number of 5 or more) driving electrodes, and a plurality of detection electrodes forming capacitances between the respective driving electrodes, in which the M driving electrodes and the plurality of detection electrodes are perpendicular to each other and are disposed in a matrix; a driving circuit that is connected to the M driving electrodes, sequentially drives the M driving electrodes for each predetermined selection period in the unit of a driving electrode group including continuous Nd (where 3≤Nd<M) driving electrodes, makes a driving electrode which is located further toward a rear side in a direction in which the M driving electrodes are arranged than a driving electrode located at a center of a driving electrode group which is driven in one selection period of continuous selection periods overlap a driving electrode which is located further toward a front side in the direction in which the M driving electrodes are arranged than a driving electrode located at a center of a driving electrode group which is driven in the other selection period, and reduces a voltage of a driving signal to be applied to a driving electrode as the driving electrode forming each driving electrode group is located at a position more distant from the center of the driving electrode group; a plurality of detection circuits that are respectively connected to the plurality of detection electrodes and acquire detection voltages which respectively correspond to potentials of the plurality of detection electrodes; and a control unit that is connected to the driving circuit and the plurality of detection circuits, in which the control unit includes a coordinate acquisition portion that acquires a coordinate of a position in which an object is in contact with the touch panel in the direction in which the M driving electrodes are arranged, based on a detection voltage acquired by the detection circuit in one of the continuous selection periods and a detection voltage acquired by the detection circuit in the other selection period.

According to a second aspect of the present invention, in the first aspect of the present invention, the driving circuit linearly reduces a voltage of a driving signal to be applied to a driving electrode as the driving electrode forming each driving electrode group is located at a position more distant from the center of the driving electrode group.

According to a third aspect of the present invention, in the second aspect of the present invention, the driving circuit includes a shift register provided with K (where K<M) bistable circuits which are longitudinally connected to each other, sequentially make output signals active, and correspond to the driving electrode groups different from each other; and a driving signal generation circuit generating a driving signal which is applied to each driving signal of a driving electrode group corresponding to a bistable circuit in response to an output signal from each bistable circuit.

According to a fourth aspect of the present invention, in the third aspect of the present invention, the driving signal generation circuit includes a plurality of resistive elements with the same resistance value as each other, in which a driving electrode located at the center of each driving electrode group is connected to driving electrodes located at positions other than the center of each driving electrode group via one or more resistive elements, and in which the driving electrodes located at the positions other than the center of each driving electrode group are connected to driving electrodes other than the corresponding driving electrodes via one or more resistive elements.

According to a fifth aspect of the present invention, in the fourth aspect of the present invention, driving electrodes adjacent to each other are connected to each other via the resistive element.

According to a sixth aspect of the present invention, in the fourth aspect of the present invention, the driving signal generation circuit includes K changeover switches that are respectively controlled so as to perform changeover operations on the basis of output signals from the K bistable circuits, in which a common terminal of each changeover switch is connected to a driving electrode located at the center of a driving electrode group corresponding to a bistable circuit which controls a changeover operation of the changeover switch, in which a predetermined signal is given to one of changeover terminals of each changeover switch, and in which a fixed potential is given to the other changeover terminal of each changeover switch.

According to a seventh aspect of the present invention, in the third aspect of the present invention, the driving signal generation circuit includes Nd switching elements of which control terminals are connected to the respective bistable circuits, in which one of a plurality of signals with different potentials is given to one of conduction terminals of each of the Nd switching elements, in which the other conduction terminals of the Nd switching elements are respectively connected to Nd driving electrodes of a driving electrode group corresponding to each bistable circuit, in which a signal with the highest voltage of a plurality of signals with different voltages is given to one conduction terminal of a switching element of which the other conduction terminal is connected to a driving electrode located at the center of a driving electrode group corresponding to each bistable circuit, and in which a voltage of a signal given to one conduction terminal of a switching element of which the other conduction terminal is connected to each driving electrode linearly decreases as the driving electrode is located at a position more distant from the center of a driving electrode group including the driving electrode.

According to an eighth aspect of the present invention, in the first aspect of the present invention, each driving electrode is formed so as to have a width of 1 mm to 2 mm.

According to a ninth aspect of the present invention, in the first aspect of the present invention, the driving circuit is integrally formed with the touch panel.

According to a tenth aspect of the present invention, in the first aspect of the present invention, the driving circuit is formed by a thin film transistor.

According to an eleventh aspect of the present invention, in the first aspect of the present invention, the driving circuit is integrally formed with the control unit.

According to a twelfth aspect of the present invention, in any one of the first to eleventh aspects of the present invention, Nd is an odd number.

According to a thirteenth aspect of the present invention, in a method of detecting a position in which an object is in contact with a touch panel that includes M (where M in a natural number of 5 or more) driving electrodes, and a plurality of detection electrodes forming capacitances between the respective driving electrodes, in which the M driving electrodes and the plurality of detection electrodes are perpendicular to each other and are disposed in a matrix, the method includes a step of sequentially driving the M driving electrodes for each predetermined selection period in the unit of a driving electrode group including continuous Nd (where $3 \leq Nd < M$) driving electrodes, making a driving electrode which is located further toward a rear side in a direction in which the M driving electrodes are arranged than a driving electrode located at a center of a driving electrode group which is driven in one selection period of continuous selection periods overlap a driving electrode which is located further toward a front side in the direction in which the M driving electrodes are arranged than a driving electrode located at a center of a driving electrode group which is driven in the other selection period, and reducing a voltage of a driving signal to be applied to a driving electrode as the driving electrode forming each driving electrode group is located at a position more distant from the center of the driving electrode group; a step of acquiring detection voltages which respectively correspond to potentials of the plurality of detection electrodes; and a step of acquiring a coordinate of a position in which the object is in contact with the touch panel in the direction in which the M driving electrodes are arranged, based on a detection voltage acquired in the step of acquiring detection voltages in one of the continuous selection periods and a detection voltage acquired in the step of acquiring detection voltages in the other selection period.

According to a fourteenth aspect of the present invention, a display device includes a display unit that displays an image; and an input device, in which the input device includes a touch panel that has M (where M is a natural number of 5 or more) driving electrodes, and a plurality of detection electrodes forming capacitances between the respective driving electrodes, in which the M driving electrodes and the plurality of detection electrodes are perpendicular to each other and are disposed in a matrix; a driving circuit that is connected to the M driving electrodes, sequentially drives the M driving electrodes for each predetermined selection period in the unit of a driving electrode group including continuous Nd (where $3 \leq Nd < M$) driving electrodes, makes a driving electrode which is located further toward a rear side in a direction in which the M driving electrodes are arranged than a driving electrode located at a center of a driving electrode group which is driven in one selection period of continuous selection periods overlap a driving electrode which is located further toward a front side in the direction in which the M driving electrodes are arranged than a driving electrode located at a center of a driving electrode group which is driven in the other selection period, and reduces a voltage of a driving signal to be applied to a driving electrode as the driving electrode forming each driving electrode group is located at a position more distant from the center of the driving electrode group; a plurality of detection circuits that are respectively connected to the plurality of detection electrodes and acquire detection voltages which respectively correspond to potentials of the plurality of detection electrodes; and a control unit that is connected to the driving circuit and the plurality of detection circuits, in which the control unit includes a coordinate acquisition portion that acquires a coordinate of a position in which an object is in contact with the touch panel in the direction in which the M driving electrodes are arranged, based on a detection voltage acquired by the detection circuit in one of the continuous selection periods and a detection voltage acquired by the detection circuit in the other selection period.

Advantageous Effects of Invention

According to the first aspect of the present invention, a plurality of driving electrodes are simultaneously driven in each selection period, and a plurality of driving electrodes which are driven are shifted for each selection period. In addition, a variation voltage decreases which is a difference between a detection voltage obtained when an object is not in contact with a position corresponding to each driving electrode group and a detection voltage obtained when the object is in contact with the position corresponding to the driving electrode, as a contact position of the object is more distant from the center of the driving electrode group. Further, in continuous selection periods, driving electrodes located further toward the rear side than the driving electrode located at the center in the driving electrode group driven in one selection period overlap driving electrodes located further toward the front side than the driving electrode DL located at the center in the driving electrode group driven in the other selection period. Therefore, the variation voltages which decrease as a contact position of the object is more distant from the center of each driving electrode group overlap so as to complement each other between the driving signal groups adjacent to each other. As a result, it is possible to detect a contact position of the object in the direction in which the driving electrodes are arranged, based on the variation voltages which are obtained in the continuous selection periods, respectively. Therefore, it is possible to improve detection accuracy without reducing a driving frequency and an S/N ratio.

In addition, according to the second aspect of the present invention, a variation voltage linearly decreases which is a difference between a detection voltage obtained when an object is not in contact with a position corresponding to each driving electrode group and a detection voltage obtained when the object is in contact with the position corresponding to the driving electrode, as a contact position of the object is more distant from the center of the driving electrode group. Accordingly, it is possible to realize detection accuracy finer than the number of driving electrodes.

According to the third aspect of the present invention, it is possible to implement the driving circuit by using the shift register and the driving signal generation circuit.

According to any one of the fourth to sixth aspects of the present invention, a single driving signal is resistance-divided by the resistive elements with the same resistance value as each other, and thus it is possible to generate a plurality of driving signals of which voltages linearly decrease as a driving signal to which a signal is to be applied is located at a position more distant from the center of a driving electrode group including the driving electrode. Particularly, the fifth aspect of the present invention is appropriate for a case where Nd is an odd number.

According to the seventh aspect of the present invention, driving signals to be applied to the M driving electrodes are generated based on operations of a plurality of switching elements provided for a single bistable circuit, and thus it is possible to reduce power consumption.

According to the eighth aspect of the present invention, it is possible to detect a coordinate of a fine object such as a pen with high accuracy.

According to the ninth aspect of the present invention, since the driving circuit is integrally formed with the touch panel, it is possible to reduce the number of wires of the driving circuit.

According to the tenth aspect of the present invention, it is possible to implement the driving circuit by using a thin film transistor.

According to the eleventh aspect of the present embodiment, the driving circuit can be implemented by an integrated circuit (IC). Therefore, the driving circuit can be implemented with high accuracy and with small area.

According to the twelfth aspect of the present invention, it is possible to further improve detection accuracy.

According to the thirteenth aspect of the present invention, in the method of detecting a contact position of an object with a touch panel, it is possible to achieve the same effect as in the first aspect of the present invention.

According to the fourteenth aspect of the present invention, in the display device provided with a touch panel, it is possible to achieve the same effect as in the first aspect of the present invention.

BRIEF DESCRIPTION OF DRAWINGS

FIG. 1 is a cross-sectional schematic view illustrating an operation of a touch panel when there is no contact.

FIG. 2 is a cross-sectional schematic view illustrating an operation of the touch panel during contact.

FIG. 3 is a block diagram illustrating a schematic configuration of a touch input device according to a first embodiment of the present invention.

FIG. 4 is an exploded perspective view illustrating a configuration of a touch panel according to the first embodiment.

FIG. 5 is a cross-sectional schematic view illustrating the touch panel shown in FIG. 4.

FIG. 6 is a block diagram illustrating a detailed configuration of the touch input device according to the first embodiment.

FIG. 7 is a block diagram illustrating a configuration of a shift register according to the first embodiment.

FIG. 8 is a signal waveform diagram illustrating an operation of the shift register according to the first embodiment.

FIG. 9 is a circuit diagram illustrating a configuration of a driving signal generation circuit according to the first embodiment.

FIG. 10 is a circuit diagram illustrating a configuration of a frontmost stage side of the driving signal generation circuit according to the first embodiment.

FIG. 11 is a circuit diagram illustrating a configuration of a last stage side of the driving signal generation circuit according to the first embodiment.

FIG. 12 is a signal waveform diagram illustrating an operation of the driving signal generation circuit according to the first embodiment.

FIG. 13 is a circuit diagram illustrating a configuration of a detection circuit and a control unit according to the first embodiment.

FIG. 14 is a signal waveform diagram illustrating an electric charge transfer operation according to the first embodiment.

FIG. 15 is a flowchart illustrating a coordinate calculation method according to the first embodiment.

FIG. 16 is a conceptual diagram illustrating a relationship between a contact position of an object and a variation voltage in the first embodiment.

FIGS. 17(A) to 17(C) are plan views illustrating a transition state of driving electrodes which are driven in the first embodiment.

FIG. 18 is a circuit diagram illustrating a configuration of a driving signal generation circuit according to a second embodiment of the present invention.

FIG. 19 is a circuit diagram illustrating a configuration of a frontmost stage side of the driving signal generation circuit according to the second embodiment.

FIG. 20 is a circuit diagram illustrating a configuration of a last stage side of the driving signal generation circuit according to the second embodiment.

FIGS. 21(A) to 21(C) are plan views illustrating a transition state of driving electrodes which are driven in the second embodiment.

FIG. 22 is a block diagram illustrating a partial configuration of a touch panel according to a third embodiment of the present invention.

FIG. 23 is a circuit diagram illustrating a configuration of a driving signal generation circuit according to a fourth embodiment.

FIG. 24 is a circuit diagram illustrating a configuration of a frontmost stage side of the driving signal generation circuit according to the fourth embodiment.

FIG. 25 is a circuit diagram illustrating a configuration of a last stage side of the driving signal generation circuit according to the fourth embodiment.

FIG. 26 is a signal waveform diagram illustrating an operation of the driving signal generation circuit according to the fourth embodiment.

FIG. 27 is an exploded perspective view illustrating a schematic configuration of a liquid crystal display according to a fifth embodiment of the present invention.

FIG. 28 is a block diagram illustrating a schematic configuration of the liquid crystal display according to the fifth embodiment.

FIG. 29 is a circuit diagram illustrating another example in the present invention.

FIGS. 30(A) to 30(C) are plan views illustrating a transition state of driving electrodes which are driven in a first related art example related to a basic study.

[FIG. 31] FIGS. 31(A) to 31(C) are plan views illustrating a transition state of driving electrodes which are driven in a second related art example related to the basic study.

[FIG. 32] FIGS. 32(A) to 32(C) are plan views illustrating a transition state of driving electrodes which are driven in a third related art example related to the basic study.

DESCRIPTION OF EMBODIMENTS

<0. Basic Study>

Prior to description of embodiments of the present invention, a description will be made of a basic study which has been carried out by the present inventors in order to solve the above-described problems.

Figure 30:
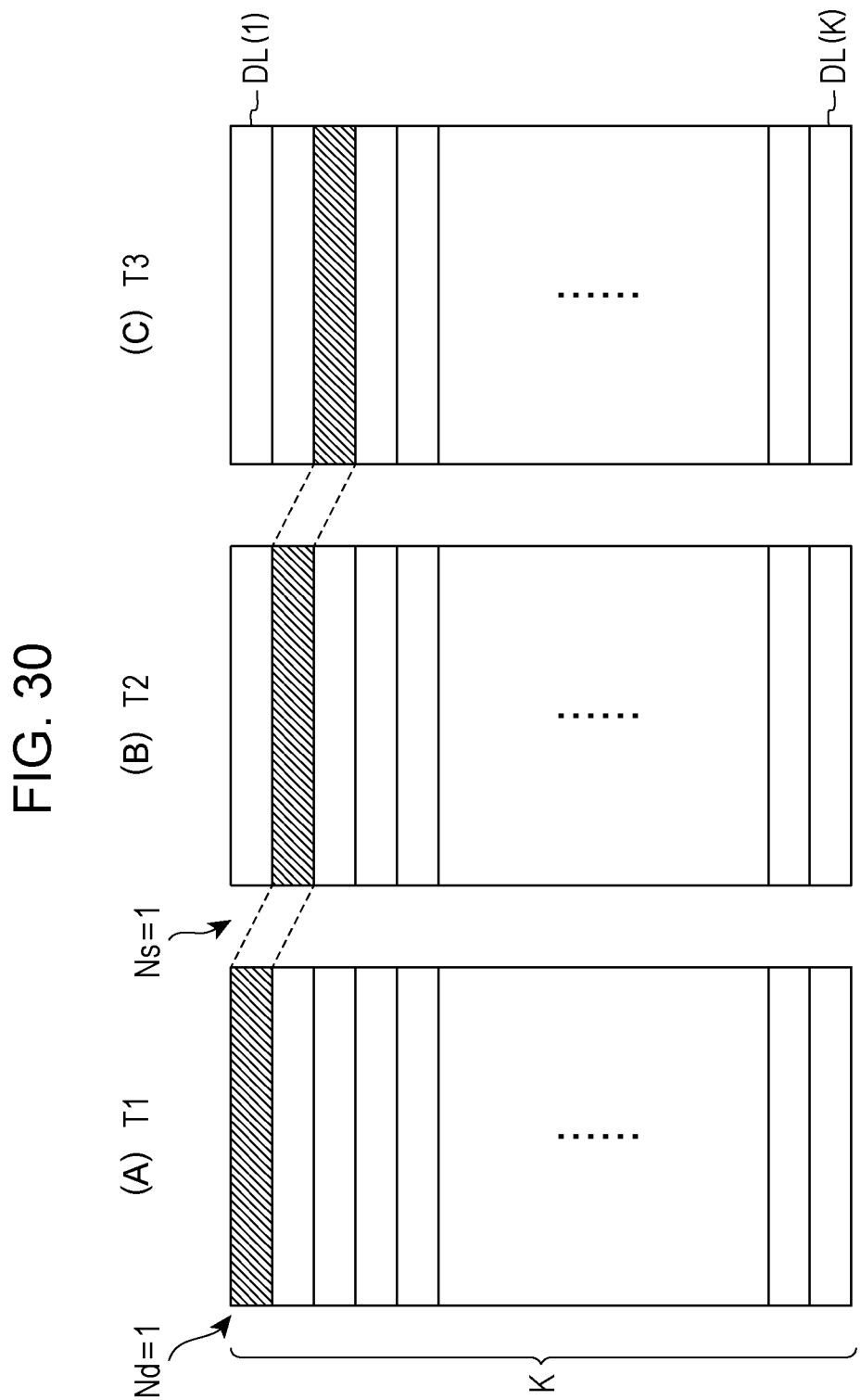
[FIG. 30]

FIGS. 30(A) to 30(C) are plan views illustrating a transition state of driving electrodes which are driven in a touch input device in the related art. Hereinafter, the touch input device in the related art shown in FIGS. 30(A) to 30(C) is referred to as a "first related art example". Here, the number of driving electrodes in the first related art example is K (DL(1) to DL(K)). In FIGS. 30(A) to 30(C), driving electrodes which are driven in selection periods T1 to T3 are respectively indicated by hatching (this is also the same for FIGS. 31(A) to 31(C), FIGS. 32(A) to 32(C), FIGS. 17(A) to 17(C), and FIGS. 21(A) to 21(C) described later). The selection period T2 is a period subsequent to the selection period T1, and the selection period T3 is a period subsequent to the selection period T2. As shown in FIGS. 30(A) to 30(C), in the first related art example, the driving electrodes are shifted one by one for each selection period so as to be driven. Hereinafter, the number of driving electrodes which are simultaneously driven in each selection period is referred to as a "simultaneously driven number Nd". In addition, the number of driving electrodes which are driven and are shifted for each selection period is referred to as a "shift number Ns". In the first related art example, the simultaneously driven number Nd is 1, and the shift number Ns is 1.

In the first related example, the width of each driving electrode is, for example, 5 mm. In this case, if a finger with the relatively large area (width) is used as an object, a position of the finger or the like can be sufficiently detected. However, if a pen (for example, a pen which is about 1 mm wide) with the relatively small width is used as an object, at which position the pen is in contact with each driving electrode cannot be determined. Therefore, it is considered that the width of each driving electrode is made to be smaller.

FIGS. 31(A) to 31(C) are plan views illustrating a transition state of driving electrodes which are driven in another touch input device in the related art. Hereinafter, the touch input device in the related art shown in FIGS. 31(A) to 31(C) is referred to as a "second related art example". Here, the number of driving electrodes in the second related art example is K×m (DL(1) to DL(K×m)) unlike in the first related art example. Hereinafter, a case of m=3 will be described as an example. The second related art example is to divide each driving electrode into m in the first related art example. In other words, a dimension of the width of each driving electrode is 1/m, and the number of driving electrodes is a multiple of m. Accordingly, the width of the driving electrode is reduced, and thus detection accuracy can be improved. Further, also in the second related art example, the simultaneously driven number Nd is 1, and the shift number Ns is 1, in the same manner as in the first related art example.

However, in the second related art example, the driving electrodes are required to be selected so as to be driven for the number of times (K×m) corresponding to a total number of the driving electrodes within one vertical scanning period. In other words, the width of the driving electrode is reduced to 1/m, and thus a driving frequency is reduced to 1/m (one vertical scanning period is lengthened). In addition, if the driving frequency is made to be the same as in the above-described first related art example without being reduced, charging of the sampling capacitor in the detection circuit is not sufficiently performed, and thus the S/N ratio is reduced.

For example, the charging of the sampling capacitor is performed by giving a burst signal having s pulses to a selected driving electrode. For this reason, in a case where the driving frequency is made to be the same as in the first related art example without being reduced as described above, the number of pulses of the burst signal is required to be s/m. Therefore, a voltage value held in the sampling capacitor becomes s/m, and thus the S/N ratio is reduced as described above.

In addition, in the second related art example, the simultaneously driven number Nd is 1 as in the first related art example, and, on the other hand, the width of each driving electrode is 1/m of the width of each driving electrode in the first related art example. This is also the same for a case where a finger with the relatively large width is an object. In other words, the S/N ratio is reduced not only in a case where a pen or the like with the relatively small width is an object but also in a case where a finger or the like with the relatively large width, in which high detection accuracy is originally not necessary, is an object.

FIGS. 32(A) to 32(C) are plan views illustrating a transition state of driving electrodes which are driven in a touch input device disclosed in PTL 1. Hereinafter, the touch input device disclosed in PTL 1 is referred to as a "third related art example". Here, the number of driving electrodes is K×m (DL(1) to DL(K×m)) in the same manner as in the above-described second related art example. In the third related art example, m driving electrodes are simultaneously driven in each selection period, and (m−1) driving electrodes overlap each other among the m driving electrodes which are driven, in the continuous selection periods. Accordingly, in a case where a finger or the like with the relatively large area is an object, it is possible to improve detection accuracy and also to suppress the S/N ratio from being reduced. In the third related art example, the simultaneously driven number Nd is m, and the shift number Ns is 1.

However, in the third related art example, the shift number Ns is 1 in the same manner as in the second related art example, and thus the driving electrodes are required to be selected so as to be driven for the number of times (K×m) corresponding to a total number of the driving electrodes. In other words, the width of the driving electrode is reduced to 1/m, and thus a driving frequency is reduced to 1/m (one vertical scanning period is lengthened). In addition, if the driving frequency is made to be the same as in the above-described first related art example without being reduced, charging of the above-described sampling capacitor is not sufficiently performed, and thus the S/N ratio is reduced.

A description will be made of embodiments of the present invention which has been made by the present inventors based on the above-described basic study with reference to the accompanying drawings.

<1. First Embodiment>

First, as a premise of the present invention, a description will be made of an operation principle of a touch panel (hereinafter, simply referred to as a "mutual capacitive touch panel") employing a mutual capacitance type of capacitance types.

<1.1 Fundamental Principle of Mutual Capacitive Touch Panel>

Figure 1:
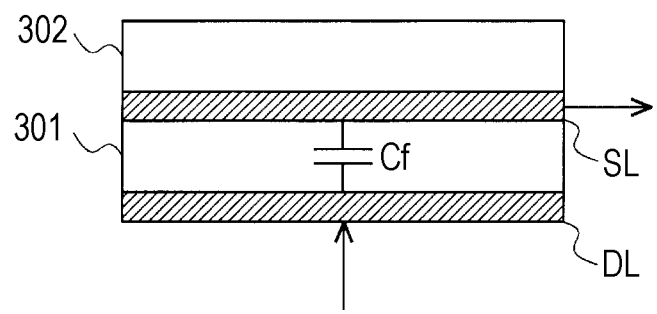
[FIG. 1]

FIG. 1 is a cross-sectional schematic view illustrating a case where an object is not in contact with a mutual capacitive touch panel. As shown in FIG. 1, the touch panel includes a first dielectric 301, a driving electrode DL and a detection electrode SL disposed so as to be opposed to each other with the first dielectric 301 interposed therebetween, and a second dielectric 302 disposed on the detection electrode SL. A capacitor (hereinafter, referred to as an "inter-electrode capacitor Cf") is formed between the driving electrode DL and the detection electrode SL. A driving signal is applied to the driving electrode DL from an external device. Electric charges are induced in the detection electrode SL by the driving signal. The detection electrode SL is connected to a sampling capacitor (not shown) of which one end is connected to the ground. Therefore, the sampling capacitor is charged according to the electric charges induced in the detection electrode SL.

Figure 2:
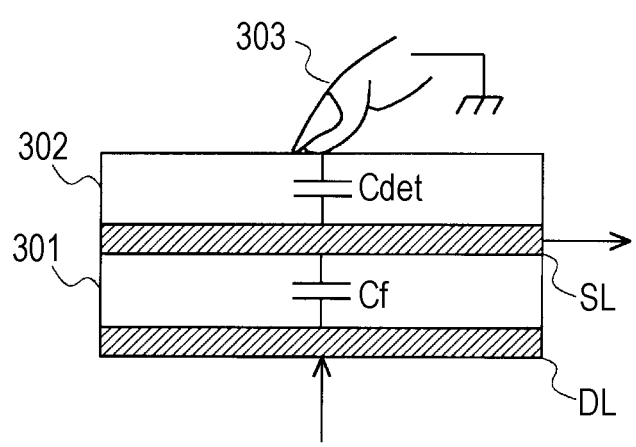
[FIG. 2]

FIG. 2 is a cross-sectional schematic view illustrating a case where an object is in contact with the touch panel shown in FIG. 1. Here, the object is a finger 303. When the finger 303 is in contact (or close) with the second dielectric 302, this is in a state equivalent to a case where a capacitor of which one end is connected to the detection electrode SL. The capacitor formed by an object such as the finger 303 in this way is hereinafter referred to as an "object capacitor Cdet". The object capacitor Cdet is connected to the detection electrode SL, and thus some of the electric charges induced in the detection electrode SL are released via the object capacitor Cdet. Accordingly, in a case where the finger 303 is in contact with the touch panel, a charging amount of the sampling capacitor becomes smaller than in a case where the above-described finger 303 is not in contact with the touch panel. In other words, in this case, a potential at a connection point between the sampling capacitor and the detection electrode SL becomes smaller than in a case where the finger 303 is not in contact with the touch panel.

In this mutual capacitive touch panel, a potential variation at the connection point between the sampling capacitor and the detection electrode SL is read using a detection circuit described later, thereby detecting a position of an object.

<1.2 Schematic Configuration of Touch Input Device>

Figure 3:
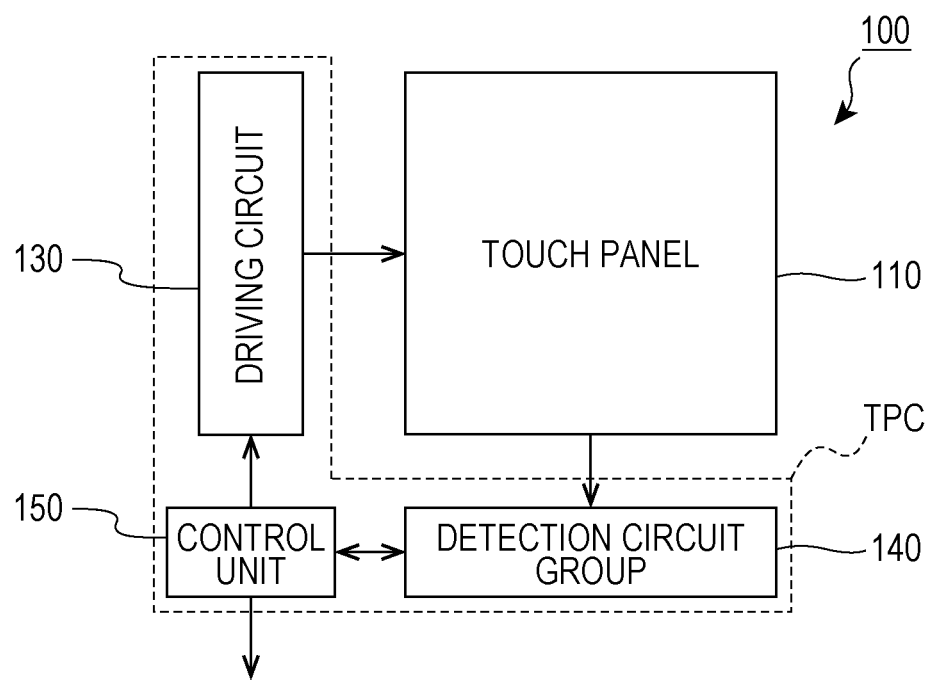
[FIG. 3]

FIG. 3 is a block diagram illustrating a schematic configuration of a touch input device according to a first embodiment of the present invention. As shown in FIG. 3, a touch input device 100 according to the present embodiment includes a touch panel 110, and a touch panel controller TPC connected to the touch panel 110. The touch panel controller TPC is implemented by an integrated circuit (IC), and includes a driving circuit 130, a detection circuit group 140, and a control unit 150. In addition, the driving circuit 130, the detection circuit group 140, and the control unit 150 may be respectively implemented by different ICs. The driving circuit 130 and the detection circuit group 140 are connected to the touch panel 110. The control unit 150 is connected to the driving circuit 130 and the detection circuit group 140.

<1.3 Configuration of Touch Panel>

Figure 4:
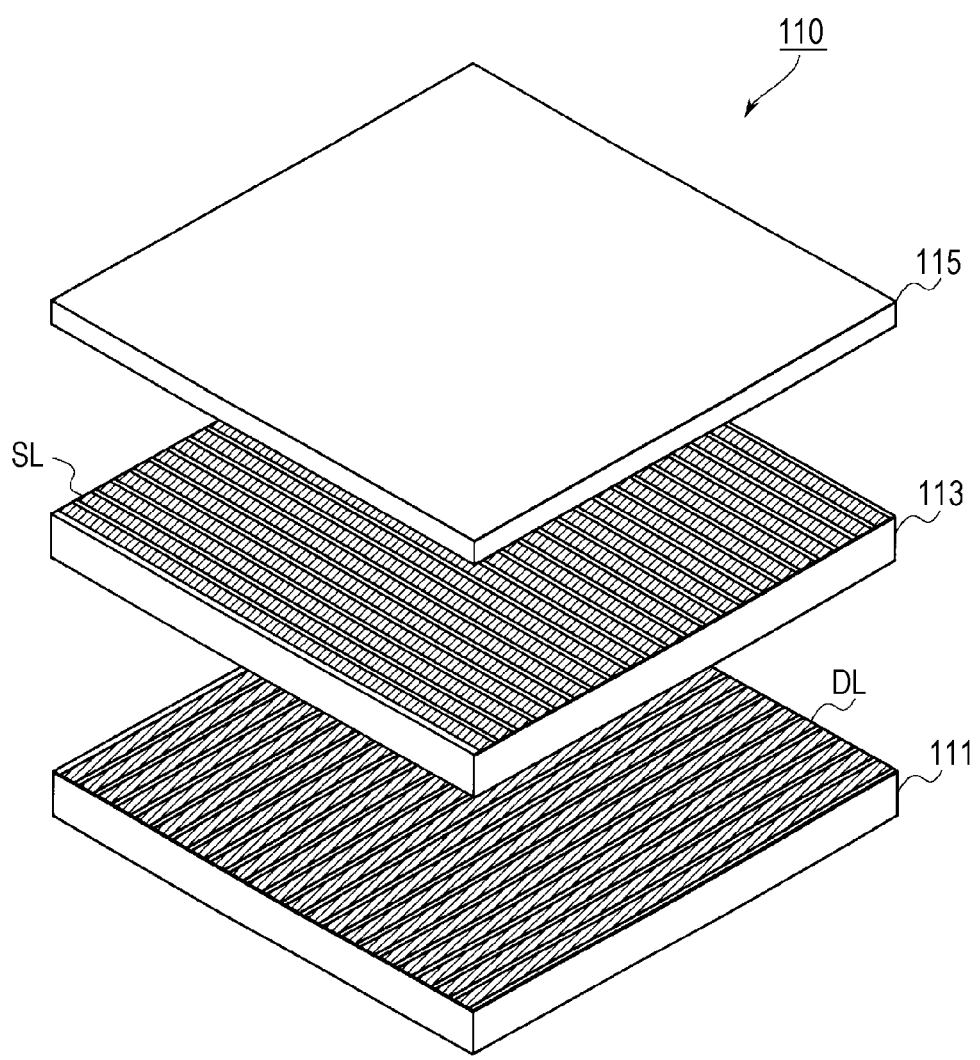
[FIG. 4]
Figure 5:
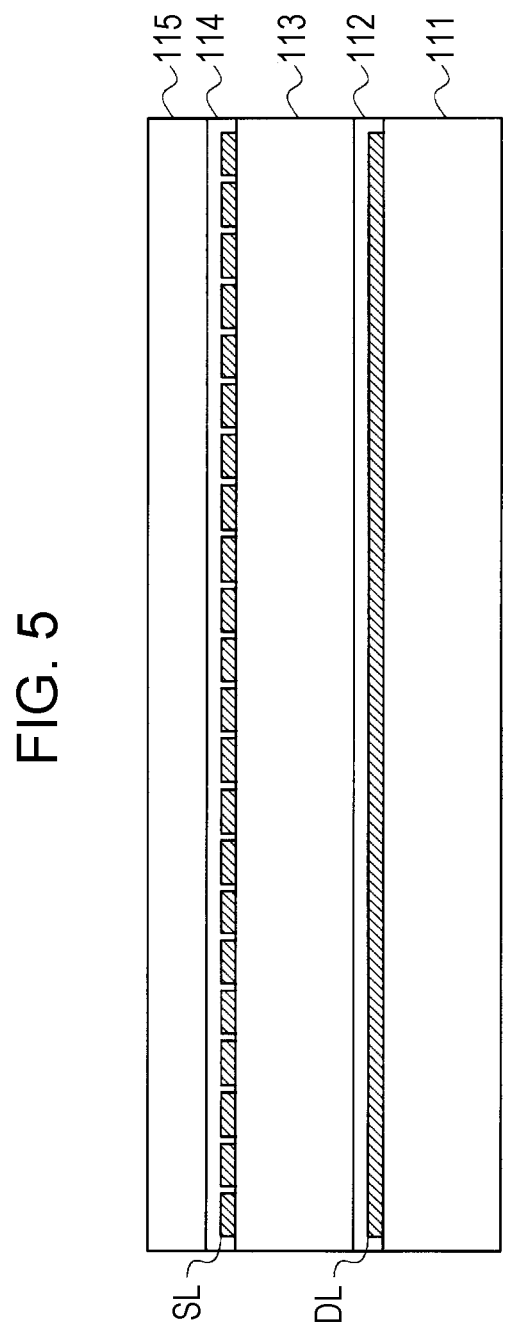
[FIG. 5]

FIG. 4 is an exploded perspective view illustrating a configuration of the mutual capacitive touch panel 110 according to the present embodiment. FIG. 5 is a cross-sectional schematic view of the touch panel 110 shown in FIG. 4. As shown in FIGS. 4 and 5, the touch panel 110 includes a first insulating substrate 111, M (where M is a natural number of 5 or more) driving electrodes DL(1) to DL(M) (hereinafter, referred to as a "driving electrode DL" in a case where they are differentiated from each other) disposed on a surface of the first insulating substrate 111, a second insulating substrate 113 disposed on the M driving electrodes DL(1) to DL(M), N detection electrodes SL(1) to SL(N) (hereinafter, referred to as a "detection electrode SL" in a case where they are differentiated from each other) disposed on a surface of the second insulating substrate 113, and a cover glass 115 disposed on the N detection electrodes SL(1) to SL(N). Hereinafter, a direction in which the driving electrodes DL(1) to DL(M) are arranged is set to an "X direction", and a direction in which the detection electrodes SL(1) to SL(N) are arranged is set to a "Y direction".

In the present embodiment, the width of each driving electrode is 1/m of that in the above-described first related art example, and the number of driving electrodes is m times the number thereof in the first related art example. In other words, the number M of the driving electrodes DL in the present embodiment corresponds to the number K×m of the driving electrodes DL in the above-described second and third related art examples. Here, the width of each driving electrode DL and the number M of the driving electrodes in the present embodiment respectively correspond to the width of each driving electrode DL and the number K×3 of the driving electrodes in a case of m=3 in the second and third related art examples.

As shown in FIG. 4, the driving electrodes DL(1) to DL(M) and the detection electrodes SL(1) to SL(N) are perpendicular to each other and are arranged in a matrix. As shown in FIG. 5, the first insulating substrate 111 of which the driving electrodes DL(1) to DL(M) are disposed on the surface and the second insulating substrate 113 of which the detection electrodes SL(1) to SL(N) are disposed on the surface are adhered to each other via a transparent adhesive 112. In addition, the second insulating substrate 113 of which the detection electrodes SL(1) to SL(N) are disposed on the surface and the cover glass 115 are adhered to each other via a transparent adhesive 114. The first insulating substrate 111 and the second insulating substrate 113 are made of glass, acryl, or the like. The second insulating substrate 113 corresponds to the above-described first dielectric 301. Further, the cover glass 115 corresponds to the above-described second dielectric 302. Furthermore, in the present invention, a structure of the mutual capacitive touch panel 110 is not particularly limited, and may have various modifications. For example, the driving electrodes DL(1) to DL(M) may be disposed on the rear surface of the second insulating substrate instead of the front surface of the first insulating substrate 111. Moreover, the driving electrodes DL(1) to DL(M) may be disposed so as to be coplanar with the detection electrodes SL(1) to SL(N) as in a general diamond pattern. In addition, in a case where the touch input device 100 is used in combination with a display device as in a fifth embodiment described later, the driving electrodes DL(1) to DL(M) may be disposed on an opposed substrate of a display unit of the display device without providing the first insulating substrate 111.

<1.4 Detailed Configuration of Touch Input Device>

Figure 6:
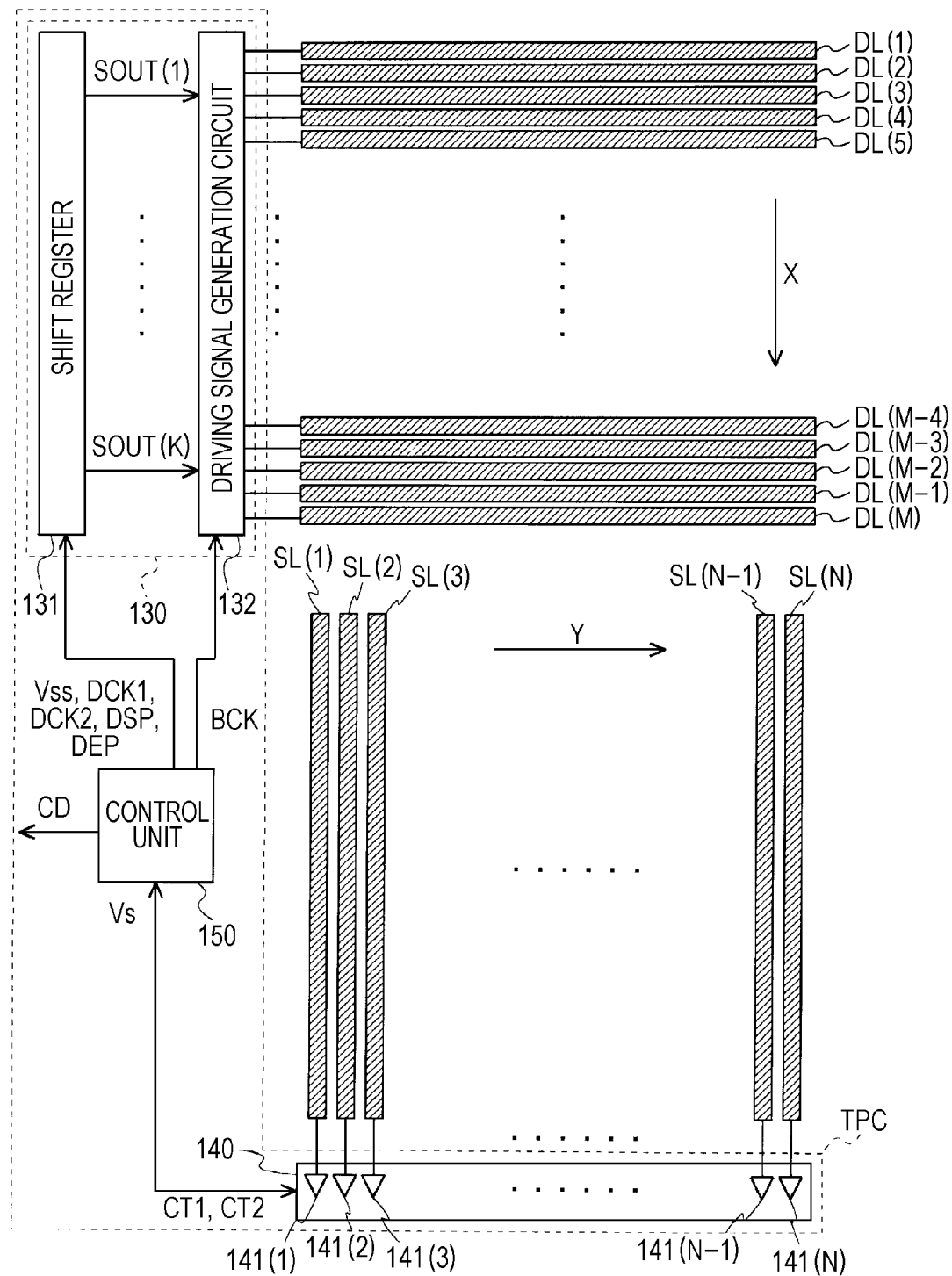
[FIG. 6]

FIG. 6 is a block diagram illustrating a detailed configuration of the touch input device 100 according to the present embodiment. The arrows in FIG. 6 indicate the X direction and the Y direction. As shown in FIG. 6, the driving circuit 130 includes a shift register 131 and a driving signal generation circuit 132 which is a driving output circuit connected to the shift register 131. The driving signal generation circuit 132 is connected to the driving electrodes DL(1) to DL(M). The driving circuit 130 will be described later in detail.

The detection circuit group 140 includes N detection circuits 141(1) to 141(N) (hereinafter, referred to as a "detection circuit 141" in a case where they are not differentiated from each other). The detection circuits 141(1) to 141(N) are respectively connected to the detection electrodes SL(1) to SL(N). Each detection circuit 141 gives a detection voltage Vs described later to the control unit 150. The detection circuit 141 will be described later in detail.

The control unit 150 is given a predetermined power supply potential from an external device (not shown). The control unit 150 gives a predetermined power supply potential Vss (hereinafter, simply referred to as a "power supply potential Vss") for driving each flip-flop described later, a first drive clock signal DCK1, a second drive clock signal DCK2, a drive start pulse signal DSP, and a drive end pulse signal DEP to the shift register 131, and gives a burst clock signal BCK to the driving signal generation circuit 132. In addition, the control unit 150 gives detection control signals CT1 and CT2 to each detection circuit 141. The control unit 150 will be described later in detail.

<1.4.1 Configuration and Operation of Driving Circuit>

The driving circuit 130 according to the present embodiment is implemented inside the touch panel controller TPC which is an IC as described above. Therefore, the driving circuit 130 is implemented using monocrystalline silicon or the like. The driving circuit 130 sequentially drives the M driving electrodes DL(1) to DL(M) for each selection period in the units of driving electrode groups GDL(1) to GDL(K) (hereinafter, referred to as a "driving electrode group GDL" in a case where they are not differentiated from each other) which respectively include continuous Nd (3≤Nd<M) driving electrodes. Hereinafter, a configuration and an operation of the driving circuit 130 for realizing this driving will be described.

<1.4.1.1 Configuration and Operation of Shift Register>

Figure 7:
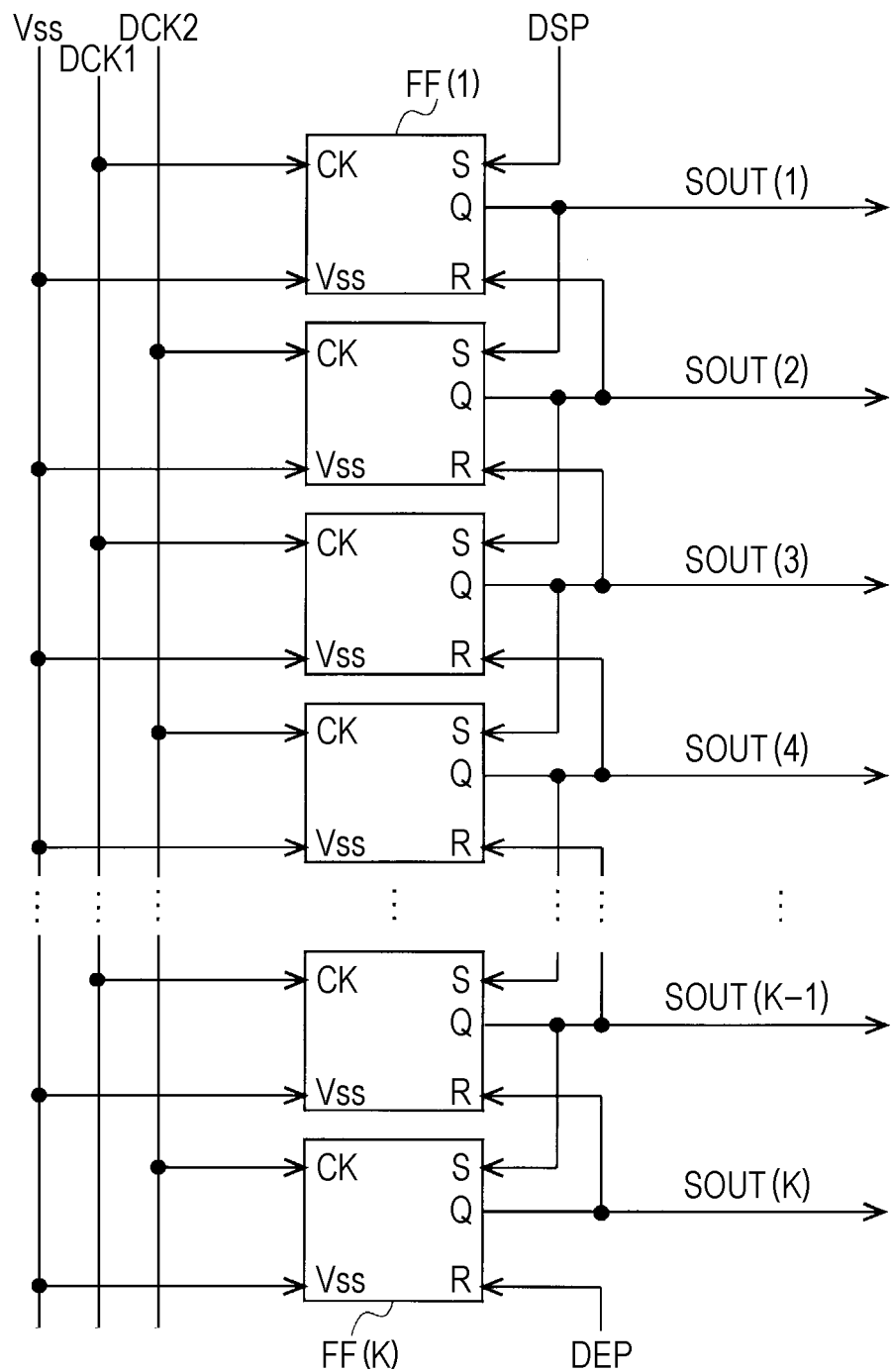
[FIG. 7]

FIG. 7 is a block diagram illustrating a configuration of the shift register 131 of the driving circuit 130. As shown in FIG. 7, the shift register 131 is constituted by a plurality of stages (K stages). The K stages of the shift register 131 are in either of two states (first and second states) at each time point, and respectively include flip-flops FF(1) to FF(K) (hereinafter, referred to as a "flip-flop FF" in a case where they are not differentiated from each other) which are bistable circuits outputting a signal (hereinafter, referred to as a "stage signal") indicating a corresponding state. In this way, the shift register 131 includes K flip-flops FF(1) to FF(K). The flip-flops FF(1) to FF(K) respectively correspond to the above-described driving electrode groups GDL(1) to GDL(K).

Each flip-flop FF has an input terminal for receiving a clock signal CK (hereinafter, referred to as an "input clock CK"), an input terminal for receiving the power supply potential Vss, an input terminal for receiving a set signal S, an input terminal for receiving a reset signal R, and an output terminal for outputting a state signal Q.

Figure 8:
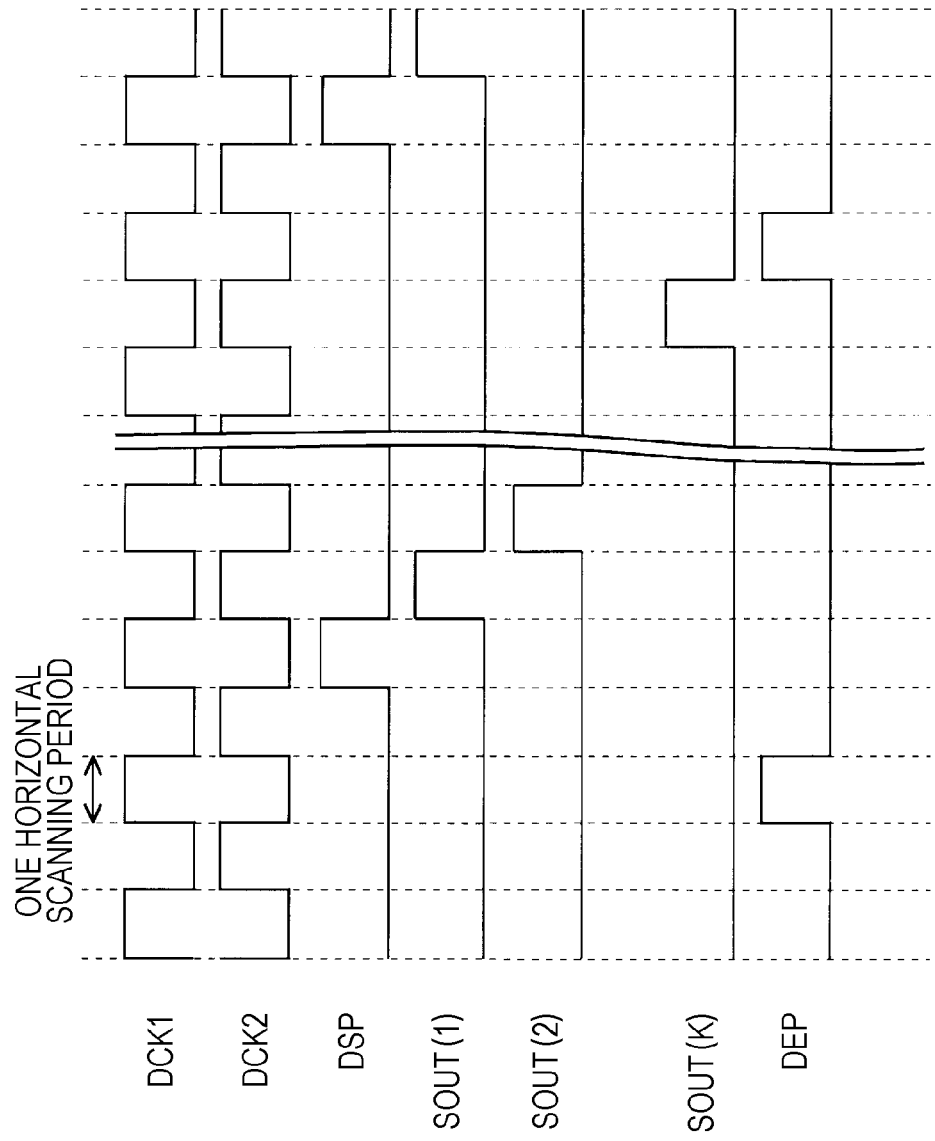
[FIG. 8]

The shift register 131 is given the above-described first drive clock signal DCK1 and second drive clock signal DCK2 which are two-phase clock signals as drive clock signals DCK. As shown in FIG. 8, the first drive clock signal DCK1 and the second drive clock signal DCK2 are deviated from each other in a phase by one horizontal scanning period, and both of the two are in a high level (H level) state during one horizontal scanning period of two horizontal scanning periods.

Signals given to the input terminals of the flip-flop FF in each stage are as follows. The first drive clock signal DCK1 is given to the first stage flip-flop FF(1) as the input clock CK. The second drive clock signal DCK2 is given to the second stage flip-flop FF(2) as the input clock CK. The same configuration as the configuration in the first and second stages is repeated every two stages from the third stage. In addition, the drive start pulse signal DSP is given to the first stage flip-flop FF(1) as the set signal S. A previous stage state signal Q is given to the flip-flops FF(2) to FF(K) in the second stage and thereafter as the set signal S. In addition, the drive end pulse signal DEP is given to the K-th stage flip-flop FF(K) as the reset signal R. A next stage state signal Q is given to the flip-flops FF(1) to FF(K) in the (K−1)-th stage and therebefore as the reset signal R. In this way, the flip-flops FF(1) to FF(K) are longitudinally connected to each other. Further, without using the drive end pulse signal DEP, a dummy flip-flop (K+1) may be provided in the next stage of the K-th stage flip-flop FF(K), and a state signal Q of the flip-flop (K+1) may be given to the K-th stage flip-flop FF(K) as the reset signal R. The power supply potential Vss is given in common to all the flip-flops FF.

In the above-described configuration, when the drive start pulse signal DSP is given to the first stage flip-flop FF(1) of the shift register 131 as the set signal S, a pulse (this pulse is included in the state signal Q which is output from each flip-flop FF) included in the drive start pulse signal DSP is sequentially transmitted from the first stage flip-flop FF(1) to the K-th stage flip-flop FF(K) on the basis of the first drive clock signal DCK1 and the second drive clock signal DCK2. In addition, the state signals Q which are output from the flip-flops FF(1) to FF(K) are sequentially turned to a high level according to the transmission of the pulse. The state signals Q output from the flip-flops FF(1) to FF(K) may be given to the driving signal generation circuit 132 as shift output signals SOUT(1) to SOUT(K) (hereinafter, referred to as a "shift output signal SOUT" in a case where they are not differentiated from each other), respectively. Accordingly, as shown in FIG. 8, the shift output signals SOUT which are sequentially in a high level (active) every one horizontal scanning period are given to the driving signal generation circuit 132. In other words, a selection period which is a period when the shift output signal SOUT is in a high level sequentially transitions. Hereinafter, selection periods when the shift output signals SOUT(1) to SOUT(K) are in a high level are respectively indicated by the reference signs T1 to TK.

In addition, the shift register 131 according to the present invention is not limited to the above-described configuration, and may have various modifications.

<1.4.1.2 Configuration and Operation of Driving Signal Generation Circuit>

Figure 9:
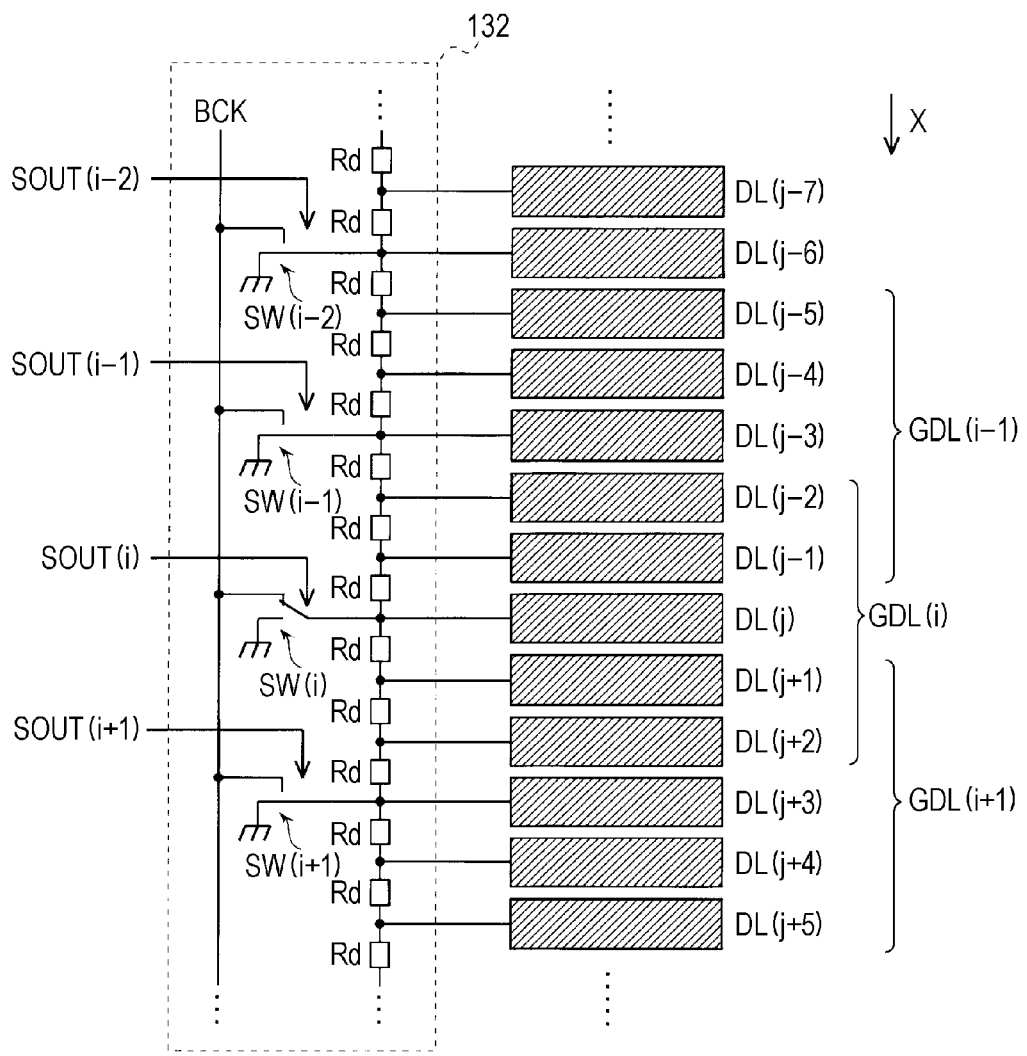
[FIG. 9]
Figure 10:
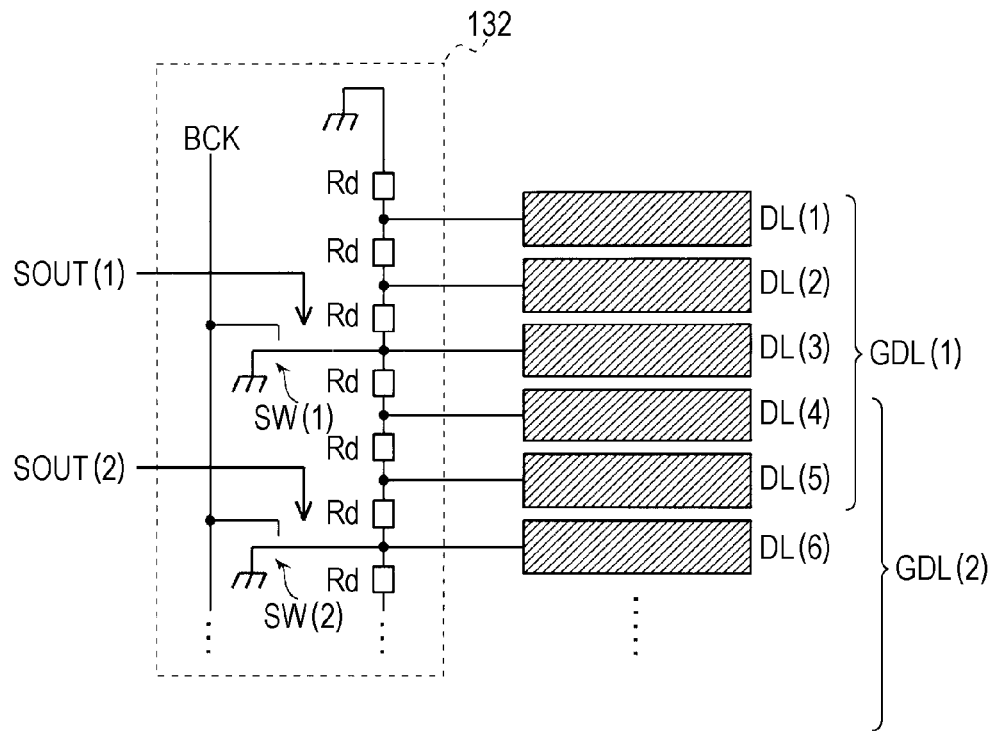
[FIG. 10]
Figure 11:
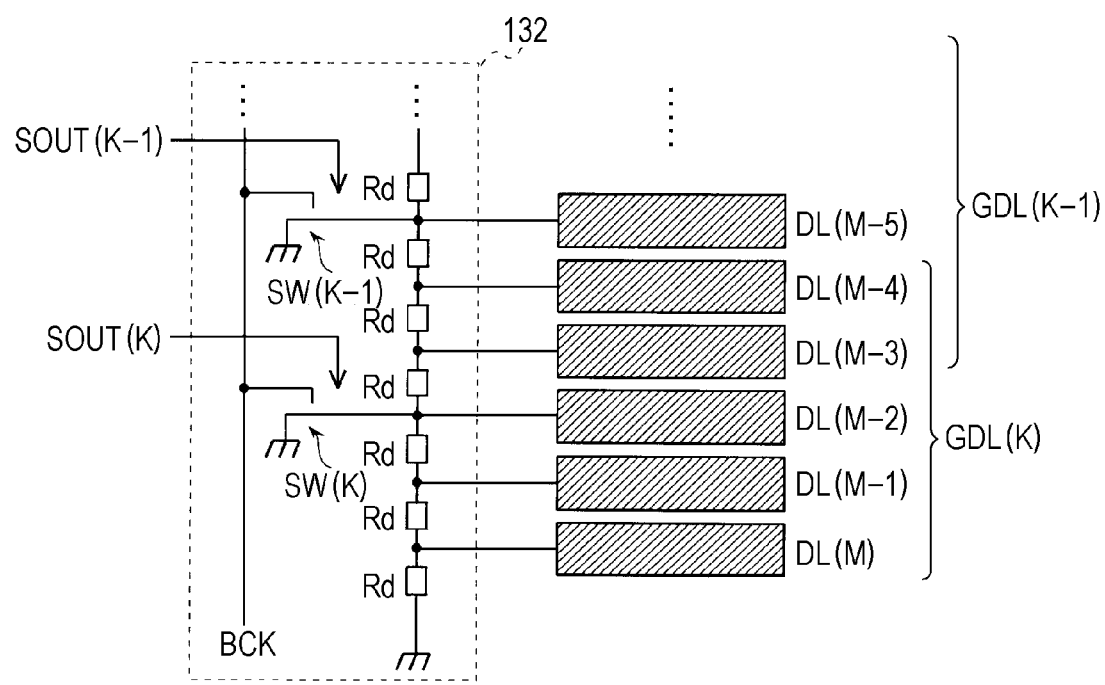
[FIG. 11]

FIG. 9 is a block diagram illustrating a configuration of the driving signal generation circuit 132 and a connection relationship between the driving signal generation circuit 132 and the driving electrodes DL. In addition, the arrow in the figure indicates the X direction. FIG. 10 is a block diagram illustrating a configuration of a frontmost stage (hereinafter, referred to as a "frontmost stage") side in the X direction of the driving signal generation circuit 132 and a connection relationship between the frontmost stage side of the driving signal generation circuit 132 and a frontmost stage side of the driving electrodes DL. FIG. 11 is a block diagram illustrating a configuration of a last stage (hereinafter, referred to as a "last stage") side of the driving signal generation circuit 132 and a connection relationship between the last stage side of the driving signal generation circuit 132 and a last stage side of the driving electrodes DL. As shown in FIGS. 9 to 11, the driving signal generation circuit 132 includes K changeover switches SW(1) to SW(K) (hereinafter, referred to as a "changeover switch SW" in a case where they are not differentiated from each other) which respectively correspond to the flip-flops FF(1) to FF(K) (the shift output signals SOUT (1) to SOUT(K)), and (M+1) resistive elements Rd with the same resistance value as each other.

As shown in FIGS. 9 to 11, the changeover switches SW(1) to SW(K) respectively correspond to the above-described driving electrode groups GDL(1) to GDL(K). Each driving electrode group GDL includes five driving electrodes DL. For example, as shown in FIG. 9, the driving electrode group GDL(i) includes five driving electrodes DL(j−2) to DL(j+2). The driving electrode group GDL(i−1) in the previous stage (hereinafter, simply referred to as a "previous stage") in the X direction of the driving electrode group GDL(i) includes five driving electrodes DL(j−5) to DL(j−1). In addition, the driving electrode group GDL(i+1) in the next stage (hereinafter, simply referred to as a "next stage") in the X direction of the driving electrode group GDL(i) includes five driving electrodes DL(j+1) to DL(j+5). As above, in the continuous driving electrode groups GDL(i−1) and GDL(i), the two driving electrodes DL(j−2) and DL(j−1) overlap each other which are located further toward a rear side (hereinafter, referred to as a "rear side") in the X direction than the driving electrode DL(j−3) located at the center of the driving electrode group GDL(i−1) and are located further toward a front side (hereinafter, referred to as a "front side") in the X direction than the driving electrode DL(j) located at the center of the driving electrode group GDL(i). Similarly, in the continuous driving electrode groups GDL(i) and GDL(i+1), the two driving electrodes DL(j+1) and DL(j+2) overlap each other which are located further toward the rear side than the driving electrode DL(j) located at the center of the driving electrode group GDL(i) and are located further toward the front side than the driving electrode DL(j+3) located at the center of the driving electrode group GDL(i+1).

As shown in FIG. 10, the frontmost stage driving electrode group GDL(1) includes five driving electrodes DL(1) to DL(5). In the driving electrode group GDL(1) and the next stage driving electrode group GDL(2), the two driving electrodes DL(4) and DL(5) overlap each other which are located further toward the rear side than the driving electrode DL(3) located at the center of the driving electrode group GDL(1) and are located further toward the front side than the driving electrode DL(6) located at the center of the driving electrode group GDL(2). The two driving electrodes DL(1) and DL(2) which are located further toward the front side than the driving electrode DL(3) located at the center of the driving electrode DL(1) do not overlap other driving electrode groups GDL.

As shown in FIG. 11, the last stage driving electrode group GDL(K) includes five driving electrodes DL(M−4) to DL(M). In the driving electrode group GDL(K) and the previous stage driving electrode group GDL(K−1), the two driving electrodes DL(M−4) and DL(M−3) overlap each other which are located further toward the front side than the driving electrode DL(M−2) located at the center of the driving electrode group GDL(K) and are located further toward the rear side than the driving electrode DL(M−5) located at the center of the driving electrode group GDL(K−1). The two driving electrodes DL(M−1) and DL(M) which are located further toward the rear side than the driving electrode DL(M−2) located at the center of the driving electrode group GDL(K) do not overlap other driving electrode groups GDL.

One (hereinafter, referred to as a "first changeover terminal") of changeover terminals of each of the changeover switches SW(1) to SW(K) is connected to a wire to which the burst clock signal BCK is given as shown in FIGS. 9 to 11. The ground potential is given to the other (hereinafter, referred to as a "second changeover terminal") of the changeover terminals of each of the changeover switches SW(1) to SW(K). In addition, a fixed potential lower than the burst clock signal BCK may be given to the second changeover terminal instead of the ground potential. A changeover operation between the first changeover terminal and the second changeover terminal in each of the changeover switches SW(1) to SW(K) is controlled based on each of the shift output signals SOUT(1) to SOUT(K). When the shift output signals SOUT(1) to SOUT(K) are in a high level, the changeover switches SW(1) to SW(K) respectively select the first changeover terminals, and when the shift output signals SOUT(1) to SOUT(K) are in a low level, the changeover switches SW(1) to SW(K) respectively select the second changeover terminals. FIGS. 9 to 11 show an example in which the shift output signal SOUT(i) is in a high level, and the shift output signals SOUT(1) to SOUT(i−1) and the shift output signals SOUT(i+1) to SOUT(K) are in a low level.

In the present embodiment, the driving electrodes DL adjacent to each other are connected to each other via a single resistive element Rd. A common terminal of each changeover switch SW is connected to the driving electrode DL located at the center of the driving electrode group GDL corresponding to the flip-flop FF which controls a changeover operation of the corresponding changeover switch, and is also connected to all the other driving electrodes DL via one or more resistive elements Rd. For example, the common terminal of the changeover switch SW(i) is connected to the driving electrode DL(j) located at the center of the driving electrode group GDL(i) corresponding to the flip-flop FF which controls a changeover operation of the corresponding changeover switch SW(i), and is also connected to all the other driving electrodes DL via one or more resistive elements Rd. In addition, the common terminal of the changeover switch SW(i) is connected to the driving electrodes DL(j−1) to DL(j−3), for example, via one to three resistive elements Rd. The common terminal of the previous stage changeover switch SW(i−1) of the changeover switch SW(i) is also connected to the driving electrode DL(j−3). Further, the common terminal of the changeover switch SW(i) is connected to the driving electrodes DL(j+1) to DL(j+3), for example, via one to three resistive elements Rd. The common terminal of the next stage changeover switch SW(i+1) of the changeover switch SW(i) is also connected to the driving electrode DL(j+3). As above, the driving electrode DL located at the center of each driving electrode group GDL and the driving electrodes DL located at the positions other than the center are connected to each other via one or more resistive elements Rd. Furthermore, a resistance value of the resistive element Rd may be different depending on a screen size and a target specification of the touch panel 110, but is preferably 1 kΩ to 10 kΩ from a relationship between power consumption and a CR time constant of the driving electrode.

In addition, the driving electrodes DL located at the positions other than the center of each driving electrode group GDL and the driving electrodes DL other than the corresponding driving electrode DL are connected to each other via one or more resistive elements. As shown in FIG. 9, the driving electrode DL(j−1) in the driving electrode group GDL(i) is connected to the driving electrodes DL(j−2) to DL(j−7), respectively, for example, via one to six resistive elements Rd. Similarly, the driving electrode DL(j−1) is connected to the driving electrodes DL(j) to DL(j+5), respectively, for example, via one to six resistive elements Rd.

In addition, as shown in FIG. 10, the wire connected to the (M+1) resistive elements Rd is grounded on the frontmost stage side. Similarly, as shown in FIG. 11, the wire connected to the (M+1) resistive elements Rd is grounded on the last stage side.

With the above-described configuration, the driving signal generation circuit 132 according to the present embodiment functions as a resistance division circuit which resistance-divides each shift output signal SOUT. The driving signal generation circuit 132 resistance-divides the shift output signal SOUT which is in a high level, so as to generate five driving signals for driving the driving electrode group GDL corresponding to the associated shift output signal SOUT. Hereinafter, an operation of the driving signal generation circuit 132 will be described.

Figure 12:
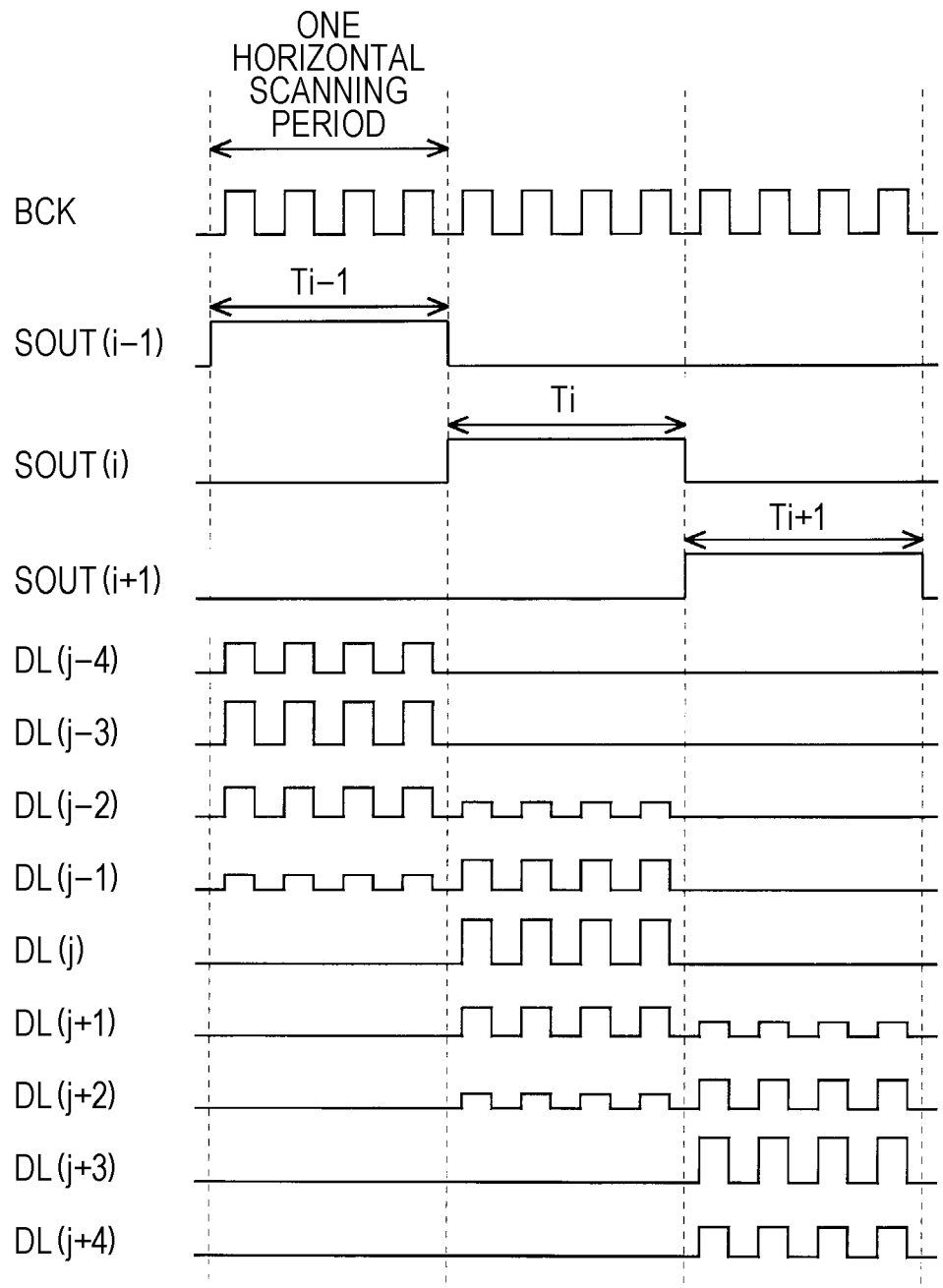
[FIG. 12]

FIG. 12 is a signal waveform diagram illustrating an operation of the driving signal generation circuit 132 according to the present embodiment. As shown in FIG. 12, a duration of the cycle of the burst clock signal BCK is ⅛ of a duration of the cycle of each of the above-described first drive clock signal DCK1 and second drive clock signal DCK2. The burst clock signal BCK includes four pulses in one horizontal scanning period.

When a selection period is Ti, in other words, when the shift output signal SOUT(i) is in a high level, the previous stage shift output signal SOUT(i−1) and the next stage shift output signal SOUT(i+1) of the shift output signal SOUT(i) are in a low level. At this time, as shown in FIG. 9, the changeover switch SW(i) selects the first changeover terminal, and the changeover switch SW(i−1) and the changeover switch SW(i+1) select the second changeover terminal. For this reason, a burst signal including four pulses which are the burst clock signal BCK of the above-described one horizontal scanning period is applied to the driving electrode DL(j) which is connected to the common terminal of the changeover switch SW(i) as a driving signal. In addition, the ground potential is given to the driving electrodes DL(j−3) and DL(j+3) to which the common terminals of the changeover switch SW(i−1) and SW(i+1) are respectively connected.

As described above, the burst signal including four pulses which are the burst clock signal BCK of one horizontal scanning period is applied to the driving electrode DL(j) as a driving signal, and the ground potential is applied to the driving electrode (j−3). Therefore, the voltage of the burst clock signal BCK is resistance-divided so as to be applied to the driving electrodes DL(j−2) and DL(j−1) located between the driving electrodes DL(j) and DL(j−3). As described above, the common terminal of the changeover switch SW(i) is connected to the driving electrodes DL(j−1) to DL(j−3), respectively, via one to three resistive elements Rd. For this reason, as shown in FIG. 12, burst signals of which voltages are ⅔ and ⅓ of the voltage of the burst signal applied to the driving electrode DL(j) are respectively applied to the driving electrodes DL(j−1) and DL(j−2) as driving signals. Similarly, burst signals of which voltages are ⅔ and ⅓ of the voltage of the burst signal applied to the driving electrode DL(j) are respectively applied to the driving electrodes DL(j+1) and DL(j+2) as driving signals. In this way, a voltage of the driving signal to be applied to the corresponding driving electrode DL linearly decreases as the driving electrode DL forming the driving electrode group GDL(i) is located at a position more distant from the center of the driving electrode group GDL(i). In addition, at this time, the driving electrodes DL(1) to DL(j−4) and the driving electrodes DL(j+4) to DL(M) have the ground potential.

Further, also in the next selection period Ti+1 when the shift output signal SOUT(i+1) is in a high level, the same operation is performed. As shown in FIG. 12, in the selection period when the shift output signal SOUT(i) is in a high level and the selection period when the shift output signal SOUT(i+1) is in a high level, two driving electrodes DL(j+1) and DL(j+2) are driven in an overlapping manner.

As described above, in the driving circuit 130 according to the present embodiment, as the driving electrode DL to which a voltage is to be applied in each selection period is located at a position more distant from the center of the driving electrode group GDL(i) including the corresponding driving electrode DL, five driving signals of which voltages linearly decrease are generated and are respectively applied to the five driving electrodes DL. In addition, two driving electrodes DL are driven so as to overlap each other in the continuous selection periods.

<1.4.2 Configurations of Detection Circuit and Control Unit>

Figure 13:
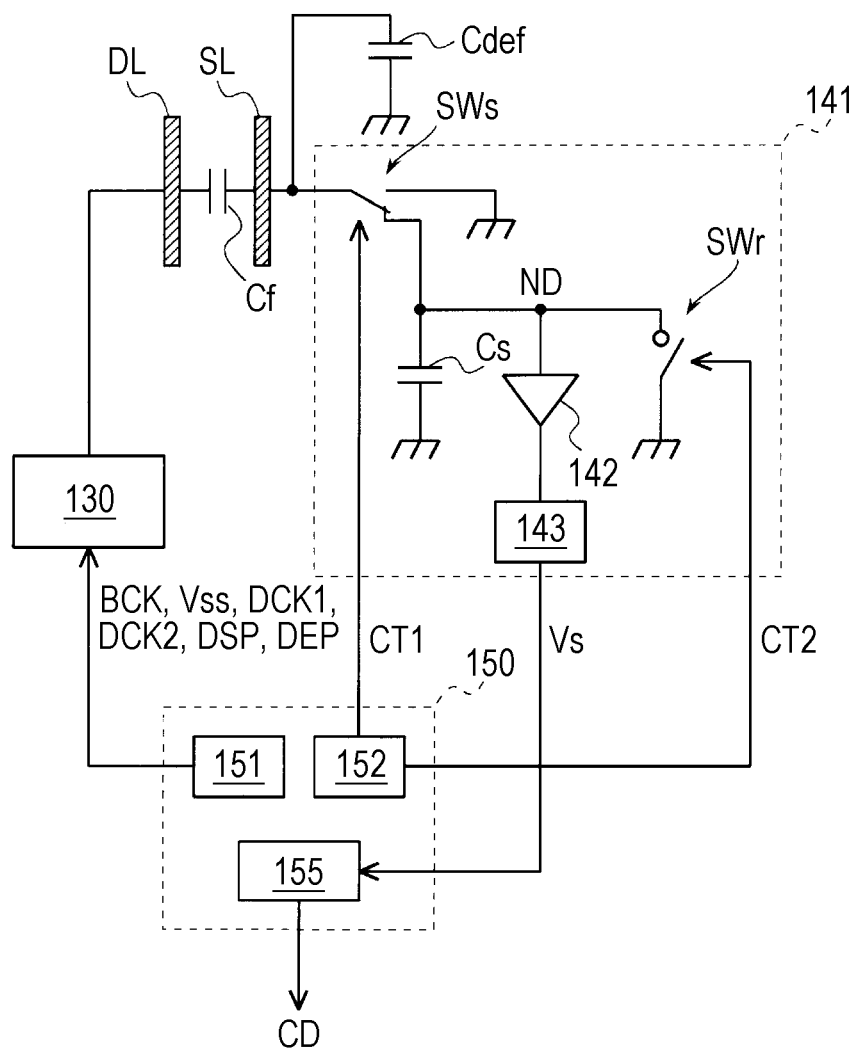
[FIG. 13]

FIG. 13 is a circuit diagram illustrating a configuration of the detection circuit 141 and the control unit 150 according to the present embodiment. In addition, in FIG. 13, for convenience of description and illustration, only a single detection circuit 141 is shown, and the other (N−1) detection circuits 141 are not shown. Further, for the same reason, the driving electrode DL, the detection electrode SL, and the inter-electrode capacitor Cf are shown singly, respectively. In practice, the M inter-electrode capacitors Cf are formed between the M driving electrodes DL and the single detection electrode SL, respectively. As shown in FIG. 13, the detection circuit 141 includes a sampling switch SWs, a reset switch SWr, a sampling capacitor Cs, an amplifier 142, and an AD converter 143. The detection circuit 141 is connected to the detection electrode SL. In a case where an object is in contact with the touch panel 110, this leads to a state in which the object capacitor Cdet is further connected to the detection electrode SL. On the other hand, in a case where an object is not in contact with the touch panel 110, the object capacitor Cdet is not formed. The detection circuit 141 will be described later in detail.

As shown in FIG. 13, the control unit 150 includes a driving control portion 151, a detection control portion 152, and a coordinate acquisition portion 155. The driving control portion 151 generates the power supply potential Vss, the first drive clock signal DCK1, the second drive clock signal DCK2, the drive start pulse signal DSP, the drive end pulse signal DEP, and the burst clock signal BCK (hereinafter, they are collectively referred to as "driving control signals"). The driving control signals are given to the driving circuit 130. The detection control portion 152 generates the detection control signals CT1 and CT2. The detection control signals CT1 and CT2 are respectively signals for controlling the sampling switch SWs and the reset switch SWr, and are given to the sampling switch SWs and the reset switch SWr. The coordinate acquisition portion 155 calculates a coordinate of a position where an object touches the touch panel 110. Coordinate data CD obtained by the coordinate acquisition portion 155 is output to an external device. The coordinate acquisition portion 155 will be described later in detail.

Next, a configuration of the detection circuit 141 will be described in detail. As shown in FIG. 13, a common terminal of the sampling switch SWs is connected to the detection electrode SL. As described above, in a case where an object is in contact with the touch panel 110, the other end of the object capacitor Cdet of which one end is grounded is connected to the detection electrode SL along with the common terminal of the sampling switch SWs. One (hereinafter, referred to as a "third changeover terminal") of selection terminals of the sampling switch SWs is grounded. The other (hereinafter, referred to as a "fourth changeover terminal") of the selection terminals of the sampling switch SWs, one end of the sampling capacitor Cs, an input terminal of the amplifier 142, and one end of the reset switch SWr are connected to each other. A region (wires) where the above-described elements are connected to each other is referred to as a "node ND", for convenience. The other end of the sampling capacitor Cs and the other end of the reset switch SWr are grounded. An output terminal of the amplifier 142 is connected to the AD converter 143.

As described above, the detection control signal CT1 is given to the sampling switch SWs. A selection operation of the sampling switch SWs is controlled depending on this detection control signal CT1. Specifically, the sampling switch SWs is controlled so as to select the fourth changeover terminal when the detection control signal CT1 is in a high level, and to select the third changeover terminal when in a low level. The detection control signal CT2 is given to the reset switch SWr. Opening and closing operations of the reset switch SWr are controlled depending on the detection control signal CT2. Specifically, the reset switch SWr is controlled so as to be closed when the detection control signal CT2 is in a high level, and to be opened when in a low level. In addition, operations other than the operations of the sampling switch SWs and the reset switch SWr in the detection circuit 141 are also controlled by the control unit 150 by using means (not shown).

<1.4.3 Method of Measuring Detection Voltage>

Figure 14:
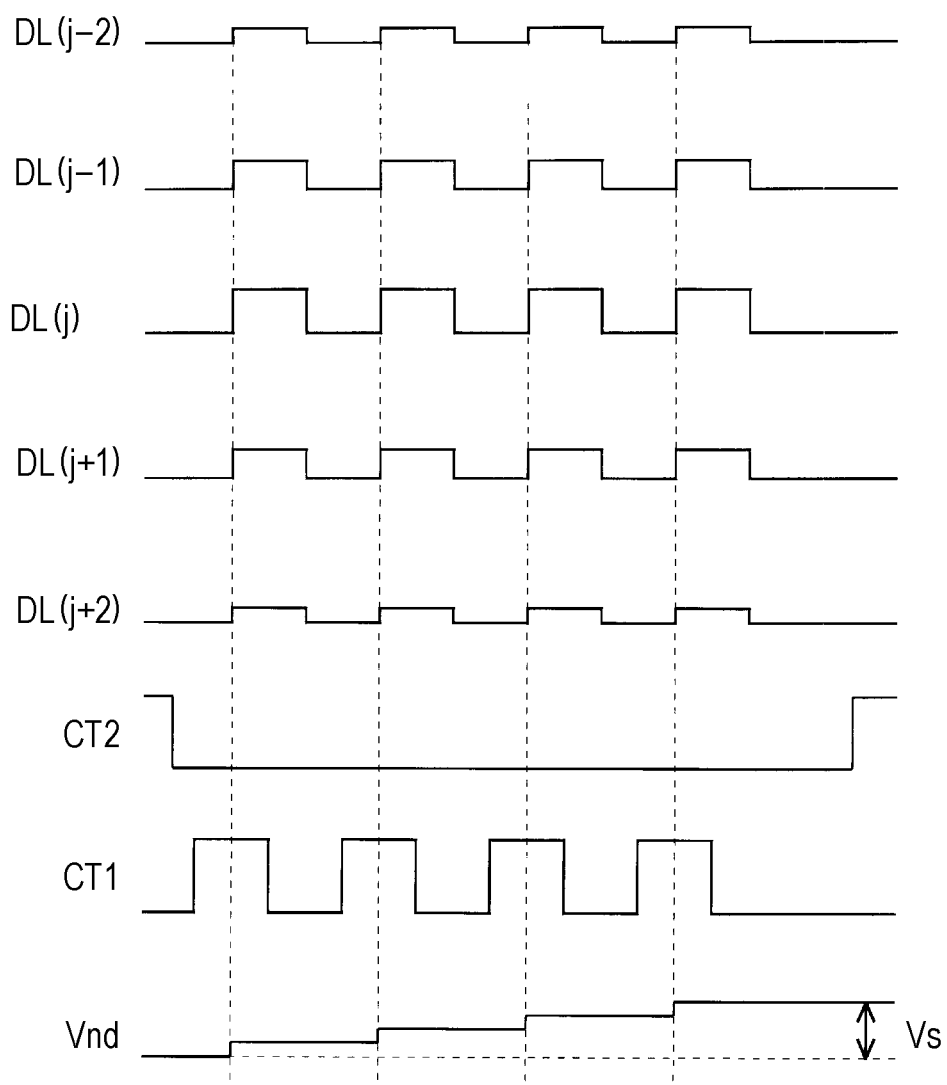
[FIG. 14]

In the present embodiment, a so-called electric charge transfer method is employed as a method of measuring a detection voltage. In addition, this electric charge transform method is disclosed in, for example, PTL 2. FIG. 14 is a signal waveform diagram illustrating a method of measuring a detection voltage according to the present embodiment. Here, it is assumed that the driving electrode group GDL(i) is driven.

First, initially, since the detection control signal CT1 is in a low level and the detection control signal CT2 is in a high level, the sampling switch SWs selects the third changeover terminal, and the reset switch SWr is in a closed state. At this time, the detection electrode SL is grounded via the third changeover terminal of the sampling switch SWs. In addition, at this time, the driving electrodes DL(j−2) and DL(j+2) are in a low level. Next, since the detection control signal CT2 is turned to a low level, the reset switch SWr is turned to an opened state. Next, the detection control signal CT1 is turned to a high level, and thus the sampling switch SWs selects the fourth changeover terminal. Accordingly, the detection electrode SL and the node ND are connected to each other via the fourth changeover terminal of the sampling switch SWs. A period from this time point to a time point when the sampling switch SWs selects the third changeover terminal again is an electric charge transfer period. After the sampling switch SWs selects the fourth changeover terminal, levels of the driving electrodes DL(j−2) to DL(j+2) vary from a low level to a high level. In other words, the first pulse rises in the burst signal (driving signal) including four pulses. Electric charges corresponding to the first pulse are transferred to the sampling capacitor Cs. As a result, a potential Vnd of the node ND increases. Next, since the detection control signal CT1 is turned to a low level, the sampling switch SWs selects the first terminal again. For this reason, the detection electrode SL is grounded. Successively, levels of the driving electrodes DL(j−2) to DL(j+2) vary from a high level to a low level. In other words, the first pulse falls. Thereafter, the same operation is repeatedly performed three times. Each time the same operation is repeatedly performed in this way, the potential Vnd increases. As a result, a detection voltage Vs corresponding to a potential of the detection electrode SL is obtained. The potential of the detection electrode SL corresponds to electric charges which are induced in the detection electrodes SL by the driving signals applied to the five driving electrodes DL(j−2) to DL(j+2).

Successively, since the detection control signal CT1 and the detection control signal CT2 are maintained in a low level, the sampling switch SWs selects the third changeover terminal, and the reset switch SWr is maintained in an opened state. At this time, the above-described detection voltage Vs is measured. The detection voltage Vs is given to the AD converter 143 via the amplifier 142. The detection voltage Vs which is an analog value is converted into a digital value by the AD converter 143. Hereinafter, for convenience of description, a detection voltage of a digital value is indicated by the reference sign Vs in the same manner as a detection voltage of an analog value. In addition, for the same reason, in the following description, a detection voltage Vs of an analog value is not differentiated from a detection voltage Vs of a digital value.

In a case where an object is not in contact with positions corresponding to the driving electrodes DL(j−2) to DL(j+2), the object capacitor Cdet is not connected to the detection electrode SL, and thus electric charges induced in the detection electrode SL are not released via the object capacitor Cdet. Here, the positions corresponding to the driving electrodes DL refer to positions on the surface of the cover glass 115, opposed to the driving electrodes DL. Hereinafter, for convenience of description, "contact with the driving electrode DL" will be described in the same meaning as "contact with a position corresponding to the driving electrode DL". On the other hand, in a case where the object is in contact with the driving electrodes DL(j−2) to DL(j+2), the object capacitor Cdet is connected to the detection electrode SL, and thus some of electric charges induced in the detection electrode SL are released via the object capacitor Cdet. Accordingly, the potential Vnd of the node ND becomes smaller than in a case where the object is not contact with the positions corresponding to the driving electrodes DL(j−2) to DL(j+2).

After the detection voltage Vs is measured, the reset switch SWr is turned to a closed state (the detection control signal CT2 is turned to a high level) again. Through the above operations, measurement of the detection voltage Vs during driving of the driving electrode group GDL(i) finishes. The detection voltage Vs is measured in the same method in a case where the driving electrode group GDL(i) and the like subsequent to the driving electrode group GDL(i+1) are driven as well. As above, the detection voltage Vs corresponding to a potential of the detection electrode SL is obtained by the detection circuit 141. In addition, in the following, detection voltages obtained by driving the driving electrode groups GDL(1) to GDL(K) are respectively indicated by the reference signs Vs(1) to Vs(K).

<1.5 Coordinate Calculation>

Figure 15:
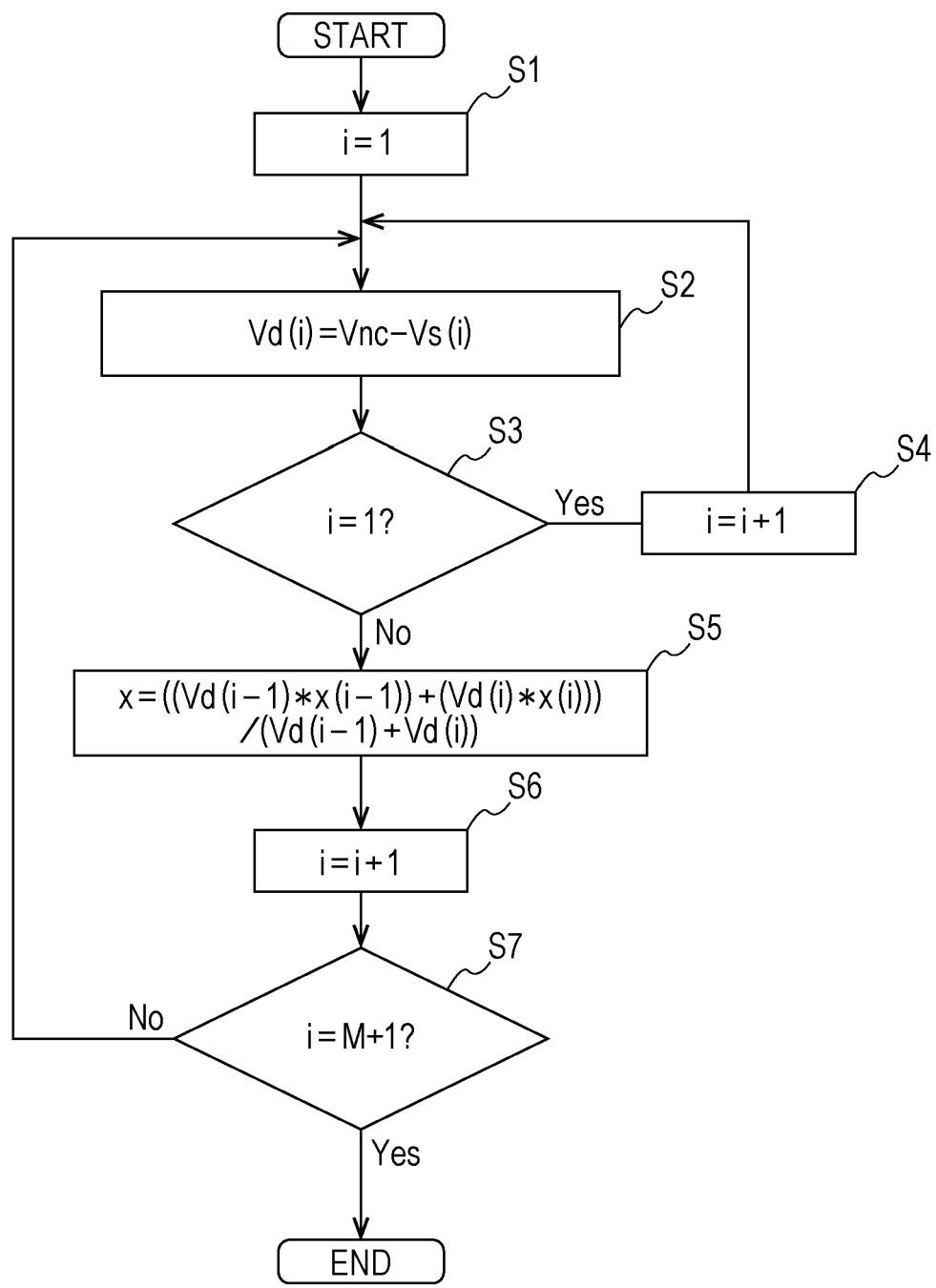
[FIG. 15]

The coordinate acquisition portion 155 according to the present embodiment includes, for example, an operation part, a main storage part, and the like. FIG. 15 is a flowchart illustrating a coordinate calculation method performed by the coordinate acquisition portion 155 according to the present embodiment. As shown in FIG. 15, i is set to 1 (step S1).

Next, a detection voltage Vs(i) is converted into a variation voltage Vd(i) on the basis of the following Equation (1) (step S2).

$$Vd(i)=Vnc-Vs(i) \quad (1)$$

Here, Vnc indicates a detection voltage Vs which is obtained by the detection circuit 141 when an object is not in contact with the driving electrode group in a case where each driving electrode group is driven. Hereinafter, the voltage Vnc is referred to as a "noncontract voltage Vnc". The variation voltage Vd(i) obtained from the above Equation (1) becomes 0 when an object is not in contact with the driving electrode group GDL(i). In addition, hereinafter, the variation voltage Vd(i) is simply referred to as a "variation voltage Vd" in some cases.

The voltage Vnc is a value common to the respective driving electrode groups, and is a known value. Therefore, when the detection voltage Vs(i) is determined, the variation voltage Vd(i) is uniquely determined. In addition, the detection voltage Vs(i) in step S2 is acquired from the detection circuit 141, for example, for each selection period. Further, alternatively, the detection voltages Vs(1) to Vs(K) may be acquired from the detection circuit 141 in advance so as to be held in the main storage part or the like, and the detection voltage Vs(i) may be sequentially read from the main storage part or the like. Furthermore, the conversion into the variation voltage Vd(i) performed in step S2 may be performed in the detection circuit 141. In this case, step S2, and steps S3 and S4 described later are not necessary.

Next, it is determined whether or not i is 1 (step S3). If i is 1, i is incremented (step S4), and the flow returns to step S2. If i is not 1, the flow proceeds to step S5.

Next, a coordinate x of the object is calculated from the variation voltage Vd(i) and the variation voltage Vd(i−1) (step S5). In other words, the coordinate x of the object in the X direction is calculated from the variation voltage Vd(i−1) corresponding to the detection voltage Vs(i−1) which is obtained in a preceding (one) selection period Ti−1 of the continuous selection periods Ti−1 and Ti and the variation voltage Vd(i) corresponding to the detection voltage Vs(i) which is obtained in the subsequent (the other) selection period Ti. In addition, an origin of the coordinate x is set to the end of the frontmost stage driving electrode DL(1). This coordinate x may be calculated using the following Equation (2).

$$x=((Vd(i-1)\times x(i-1))+(Vd(i)\times x(i)))/(Vd(i-1)+Vd(i)) \quad (2)$$

Here, x(i−1) indicates a central coordinate in the X direction of the driving electrode DL(j−3) located at the center of the driving electrode group GDL(i−1) driven during the selection period Ti−1, and x(i) indicates a central coordinate in the X direction of the driving electrode DL(j) located at the center of the driving electrode group GDL(i) driven during the selection period Ti.

Figure 16:
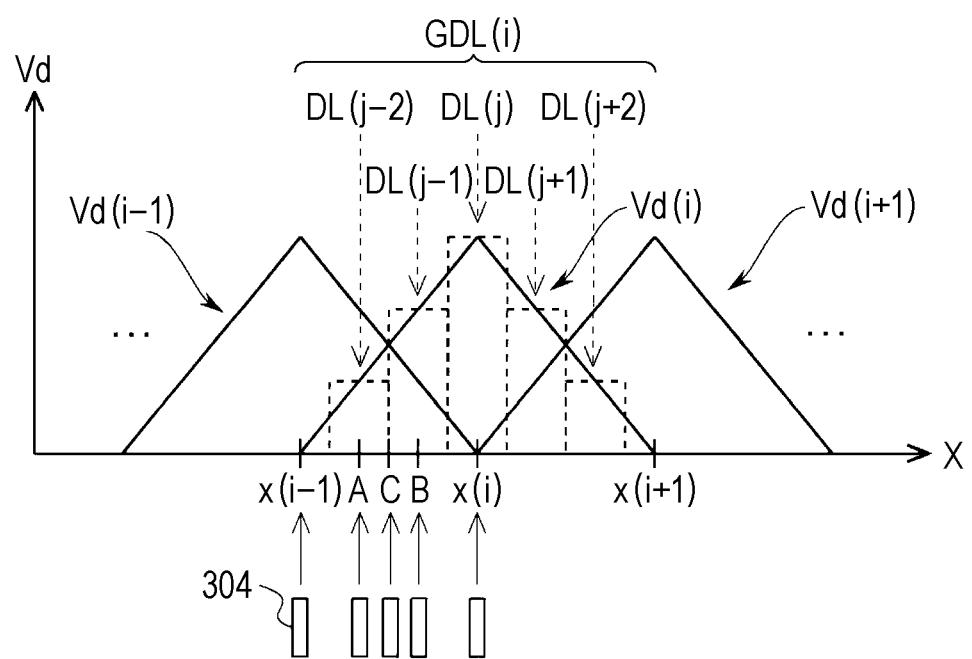
[FIG. 16]

FIG. 16 is a conceptual diagram illustrating a relationship between a contact position in the X direction of a pen 304 which is an object and a variation voltage Vd. The transverse axis expresses a contact position of the pen 304 in the X direction, and the longitudinal axis expresses a variation voltage Vd which is obtained when each driving electrode group GDL is driven. When the driving electrode group GDL(i) is driven, voltages (integrated values of four pulses) of driving signals given to the driving electrodes DL(j−2) to DL(j+2) are indicated by the broken lines.

Here, a relationship between a contact position of the pen 304 in the X direction and a variation voltage Vd will be described paying attention to the driving electrode group GDL(i), but is also the same for the other driving electrode groups GDL. As described above, if a voltage of a driving signal applied to the driving electrode DL(j) is set to 1, voltages of driving signals applied to the driving electrodes DL(j−1) and DL(j+1) become ⅔, and voltages of driving signals applied to the driving electrodes DL(j−2) and DL(j+2) become ⅓. In other words, as the driving electrode DL forming the driving electrode group GDL(i) is located at a position more distant from the center of the driving electrode group GDL(i), a voltage of a driving signal to be applied to the driving electrode DL linearly decreases. The higher the voltage of the driving signal applied to the driving electrode DL with which the pen 304 is in contact, the more an amount of electric charges is induced at a position opposed to the detection electrode SL. For this reason, an amount of electric charges which is released to the pen 304 (the object capacitor Cdet) side also increases. The more an amount of electric charges is released to the pen 304 side, the more a reduction amount of the potential Vnd of the node ND occurs than in a case where the pen 304 is not in contact. In other words, as the voltage of the driving signal applied to the driving electrode DL with which the pen 304 is in contact becomes higher, a detection voltage Vs obtained by the detection circuit 141 decreases.

Therefore, as shown in FIG. 16, if the magnitude of the variation voltage Vd(i) obtained when the pen 304 is in contact with the driving electrode DL(j) is set to 1, the magnitude of the variation voltage Vd(i) obtained when the pen is in contact with the driving electrode DL(j−1) or DL(j+1) becomes ⅔, and the magnitude of the variation voltage Vd(i) obtained when in contact with the driving electrode DL(j−2) or DL(j+2) becomes ⅓. In other words, in the driving electrode group GDL(i), the variation voltage Vd(i) is the maximum when a contact position is the central driving electrode DL(j), and, as a contact position is more distant from the central position, a value of the variation voltage Vd(i) linearly decreases.

Next, a description will be made of a method of calculating the coordinate x based on the above Equation (2), using a specific example in which the width of each driving electrode DL is 1 mm, x(i−1) is 10 mm, and x(i) is 13 mm. In a case where the pen 304 is in contact with the driving electrode DL(j−3), Vs(i−1)=1, and Vs(i)=0. In this case, the coordinate x is calculated as 10 mm (=x(i−1)) according to the above Equation (2). In addition, in a case where the pen 304 is in contact with the driving electrode DL(j), Vs(i−1)=0, and Vs(i)=1. In this case, the coordinate x is calculated as 13 mm (=x(i)) according to the above Equation (2).

In a case where the pen 304 is in contact with the driving electrode DL(j−2), Vs(i−1)=⅔, and Vs(i)=⅓. In this case, the coordinate x is calculated as 11 mm (the coordinate A in FIG. 16) according to the above Equation (2). In addition, in a case where the pen 304 is in contact with the driving electrode DL(j−1), Vs(i−1)=⅓, and Vs(i)=⅔. In this case, the coordinate x is calculated as 12 mm (the coordinate B in FIG. 16) according to the above Equation (2).

As above, in the present embodiment, it is possible to detect with which driving electrode DL the pen 304 is in contact among the M driving electrodes DL(1) to DL(M). In addition, in the present embodiment, it is possible to also detect contact of the pen 304 between the driving electrodes DL adjacent to each other. For example, in a case where the pen 304 is in contact between the driving electrodes DL(j−2) and DL(j−1), a half of the area of the pen 304 is in contact with each of the driving electrodes DL(j−2) to DL(j−1). Therefore, a discharge amount to the pen 304 side in this case is a sum of ½ of a discharge amount in a case where the pen 304 is in contact with only the driving electrode DL(j−2) and ½ of a discharge amount in a case where the pen 304 is in contact with only the driving electrode DL(j−1). Therefore, in this case, the detection voltages Vs(i−1) and Vs(i) are obtained according to the following Equations (3) and (4).

$$Vs(i-1) = (½) \times Vso(j-2) + (½) \times Vso(j-1) = (½) \times (⅔) + (½) \times (⅓) = ½ \quad (3)$$

$$Vs(i) = (½) \times Vso(j-2) + (½) \times Vso(j-1) = (½) \times (⅓) + (½) \times (⅔) = ½ \quad (4)$$

Here, Vso(j−2) indicates a detection voltage Vs obtained in a case where the pen 304 is in contact with only the driving electrode DL(j−2). Vso(j−1) indicates a detection voltage Vs obtained in a case where the pen 304 is in contact with only the driving electrode DL(j−1).

In this case, the coordinate x is calculated as 11.5 mm (the coordinate C in FIG. 16) according to the above Equation (2).

Therefore, in the present embodiment, it is possible to detect a contact position of an object in the X direction with detection accuracy finer than the number of driving electrodes DL. This detection accuracy finer than the number of driving electrodes DL is realized since a variation in a voltage of a driving signal is linear. In a case where a variation in a voltage of a driving signal is not linear but nonlinear, Vs(i−1) and Vs(i) obtained according to the above (3) and (4) have different values even if the pen 304 is in contact between the driving electrodes DL(j−2) and DL(j−1) as described above. Therefore, the coordinate x is calculated as a value different from 11.5 mm (the coordinate C in FIG. 16). However, even in a case where a variation in a voltage of a driving signal is nonlinear, detection accuracy corresponding to the number of driving electrodes DL can be obtained. In addition, in the present embodiment, for example, the coordinate x between the coordinates A and C or the like in FIG. 16 can be obtained from the above Equations (2) to (4). Further, since a shape of a pen nib has a diameter of 1 mm to 2 mm, and a width of a driving electrode for a finger is 5 to 6 mm, the driving electrode DL in the present embodiment is preferably formed so as to have a width of 1 mm to 2 mm. Therefore, it is possible to detect a coordinate of a fine object such as a pen with high accuracy.

In addition, in a case where the pen 304 is not in contact with any of the driving electrodes DL(j−5) to DL(j+2), since Vs(i−1)=Vs(i)=0, the coordinate x is 0 (origin). In a case where x=0 as above, it is determined that an object is not in contact. In addition, alternatively, in a case where Vs(i−1)=0 and Vs(i)=0, a process may be performed in which step S5 is skipped, and then it is determined that object is not in contact.

Next, i is incremented (step S6), and then it is determined whether or not i=M+1 (step S7). If i is not M+1, the flow returns to step S2, and if i=M+1, the flow finishes. In the above-described way, it is possible to acquire a coordinate of a contact position of an object in the X direction. In addition, in practice, the above-described process is performed on the N detection circuits 141(1) to 141(N), and thus a two-dimensional coordinate in the X direction and Y direction is obtained. In addition, a coordinate in the Y direction can be acquired based on which one of the detection circuits 141(1) to 141(N) a detection voltage Vs is obtained from. A resolution of position detection in the Y direction can be increased by increasing the number of detection circuits 141. Coordinate data CD obtained by the coordinate acquisition portion 155 in the above-described way is output to an external device of the touch input device 100.

<1.6 Comparison with the Related Art Example>

Figure 17:
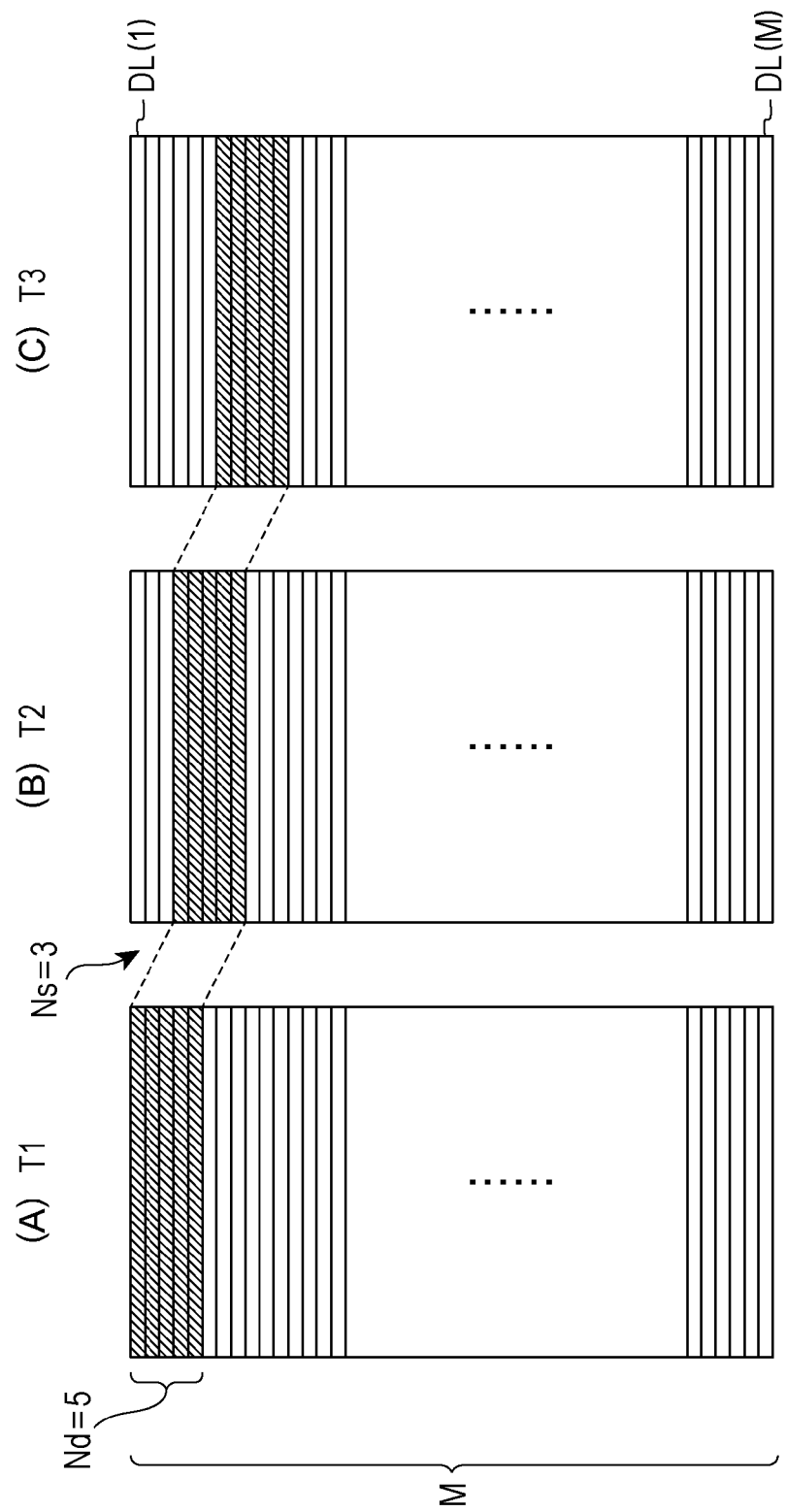
[FIG. 17]

FIGS. 17(A) to 17(C) are plan views illustrating a transition state of the driving electrodes DL which are driven in the present embodiment. As shown in FIGS. 17(A) to 17(C), in the present embodiment, the simultaneously driven number Nd is 5 (=2×m−1), and the shift number Ns is 3 (=m). On the other hand, in the above-described third related art example, as shown in FIGS. 32(A) to 32(C), the simultaneously driven number Nd is 3 (=m), and the shift number Ns is 1. Therefore, in the present embodiment, in the same manner as in the third related art example, a plurality of driving electrodes DL are simultaneously driven, and thus it is possible to suppress an S/N ratio from being reduced. In addition, since the shift number Ns is larger in the present embodiment than in the third related art example, it is possible to suppress a driving frequency from being reduced. Further, in the present embodiment, unlike in the third related art example, it is possible to detect a contact position of an object in the X direction with a resolution finer than the number of driving electrodes DL.

<1.7 Effects>

According to the present embodiment, the simultaneously driven number Nd is 5, and the shift number Ns is 3. In other words, since a plurality of driving electrodes DL are simultaneously driven in each selection period, and a plurality of driving electrodes which are driven are shifted for each selection period, it is possible to sufficiently secure a driving frequency and an S/N ratio. In addition, a variation voltage Vd decreases which is a difference between a noncontact voltage Vnc which is a detection voltage Vs obtained when an object is not in contact with each driving electrode group GDL and a detection voltage Vs obtained when the object is in contact with the driving electrode DL, as a contact position of the object is more distant from the center of the driving electrode group GDL. Further, in continuous selection periods, driving electrodes located further toward the rear side than the driving electrode DL located at the center in the driving electrode group GDL driven in the preceding selection period overlap driving electrodes located further toward the front side than the driving electrode DL located at the center in the driving electrode group GDL driven in the subsequent selection period. Therefore, as shown in FIG. 16, the variation voltages Vd which decrease as a contact position of an object is more distant from the center of each driving electrode group GDL overlap so as to complement each other between the driving electrode groups GDL adjacent to each other. As a result, it is possible to detect a contact position of an object in the X direction based on the variation voltages Vd which are obtained in continuous selection periods, respectively. Therefore, it is possible to improve detection accuracy without reducing a driving frequency and an S/N ratio.

In addition, according to the present embodiment, the variation voltage Vd linearly decreases as a contact position of an object is more distant from the center of the driving electrode group GDL. Accordingly, it is possible to realize detection accuracy finer than the number of driving electrodes DL.

Further, according to the present embodiment, the burst signal including a plurality of pulses is given to the driving electrode DL as a driving signal. In the present embodiment, since a selection period with a sufficient duration is secured, it is possible to sufficiently perform charging of the sampling capacitor Cs based on the burst signal. Therefore, it is possible to secure a sufficient S/N ratio in the detection circuit 141.

In addition, according to the present embodiment, the driving circuit 130 is implemented by an IC. Therefore, the driving circuit 130 can be implemented with high accuracy and with small area.

<2. Second Embodiment>

The second embodiment of the present invention has the same configuration as the first embodiment except for the driving signal generation circuit 132 and the driving electrode DL. In addition, among constituent elements of the present embodiment, the same constituent element as in the first embodiment is given the same reference numeral, and description thereof will be omitted. The width of each driving electrode DL and the number M of driving electrodes in the present embodiment correspond to the width of each driving electrode DL and the number K×3 of driving electrodes in a case where m=5 in the above-described second and third related art examples. Therefore, in the present embodiment, the number M of driving electrodes DL is 5/3 as compared with the first embodiment, and the width of each driving electrode DL is ⅗ as compared with the first embodiment.

<2.1 Configuration of Driving Signal Generation Circuit>

Figure 18:
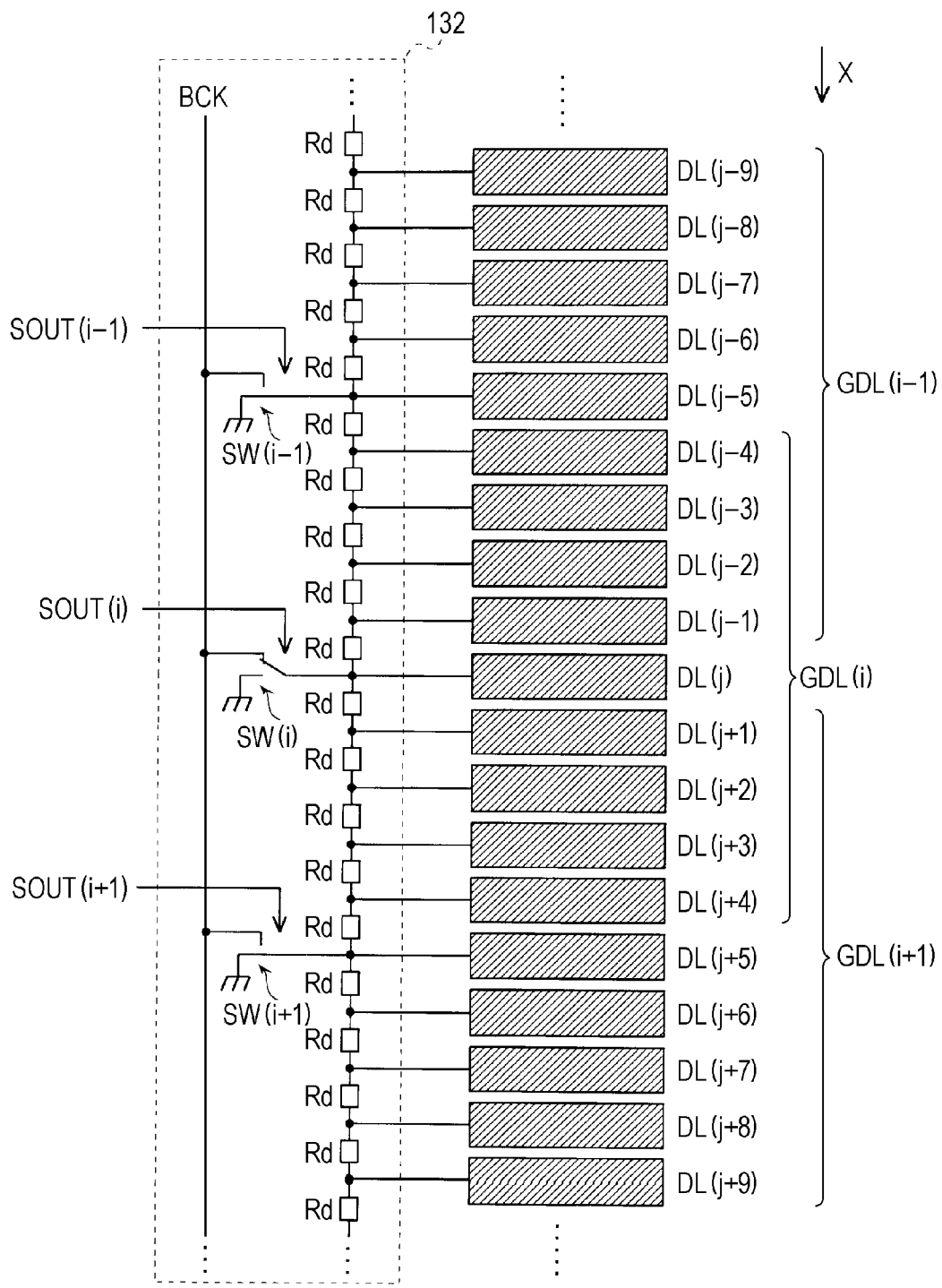
[FIG. 18]
Figure 19:
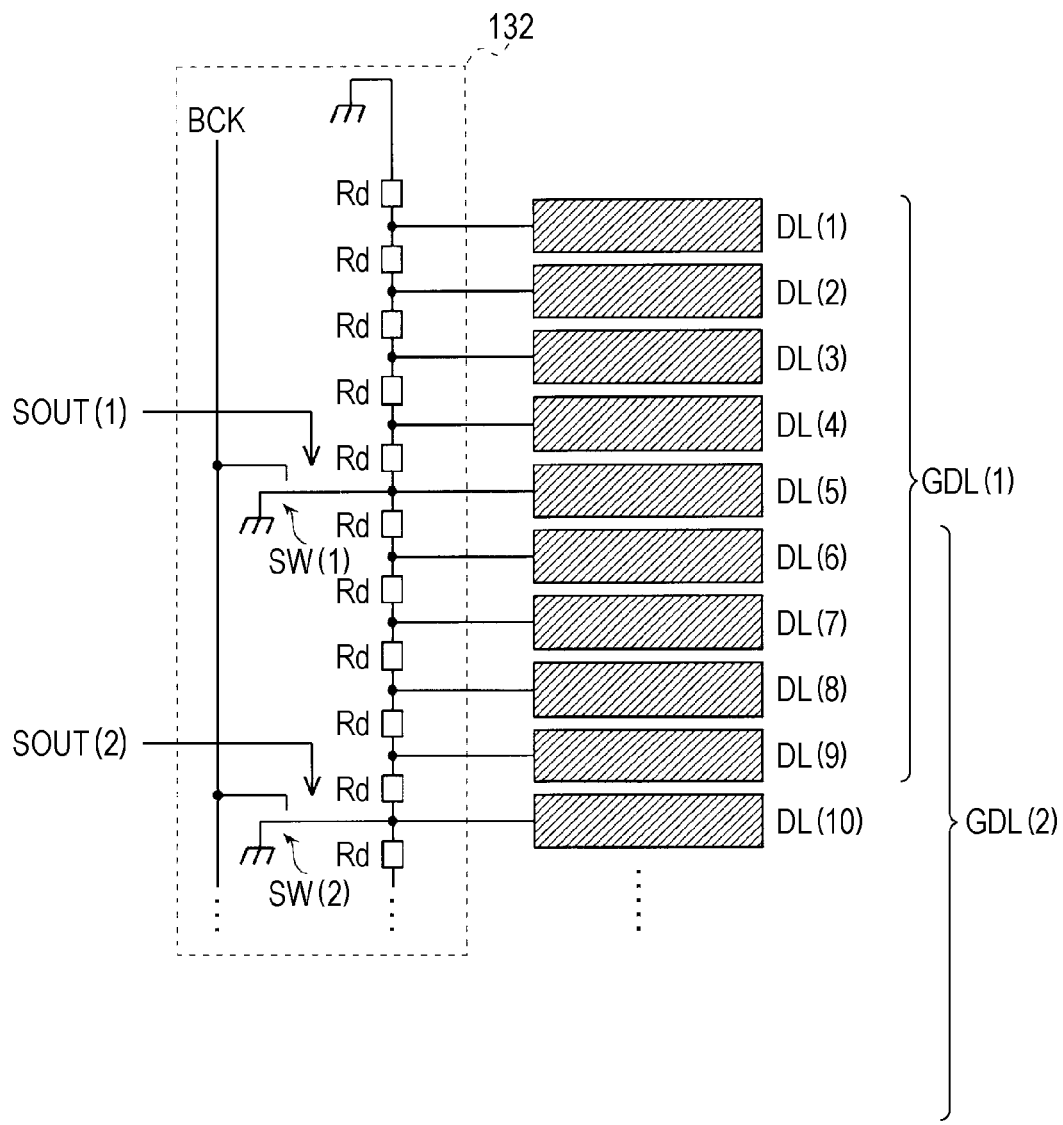
[FIG. 19]
Figure 20:
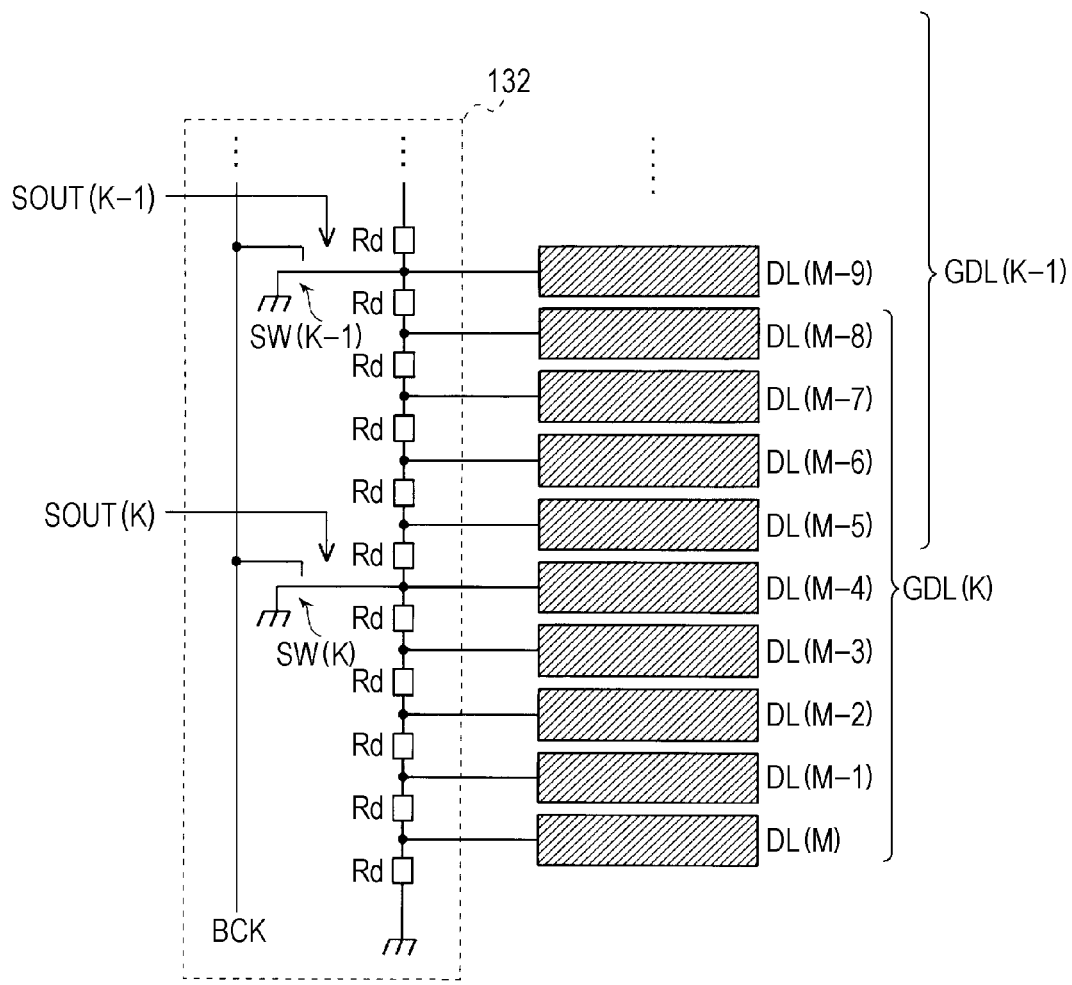
[FIG. 20]

FIG. 18 is a block diagram illustrating a configuration of a driving signal generation circuit 132 according to the present embodiment and a connection relationship between the driving signal generation circuit 132 and driving electrodes DL. The arrow in the figure indicates the X direction. FIG. 19 is a block diagram illustrating a configuration of a frontmost stage side of the driving signal generation circuit 132 according to the present embodiment and a connection relationship between the frontmost stage side of the driving signal generation circuit 132 and a frontmost stage side of the driving electrodes DL. FIG. 20 is a block diagram illustrating configuration of a last stage side of the driving signal generation circuit 132 according to the present embodiment and a connection relationship between the last stage side of the driving signal generation circuit 132 and a last stage side of the driving electrodes DL. As shown in FIGS. 18 to 20, the driving signal generation circuit 132 in the present embodiment includes K changeover switches SW(1) to SW(K) which respectively correspond to the flip-flops FF(1) to FF(K) (the shift output signals SOUT(1) to SOUT(K)), and (M+1) resistive elements Rd with the same resistance value as each other.

As shown in FIGS. 18 to 20, the changeover switches SW(1) to SW(K) respectively correspond to the above-described driving electrode groups GDL(1) to GDL(K). In the present embodiment, each driving electrode group GDL includes nine driving electrodes DL unlike in the first embodiment. For example, as shown in FIG. 18, the driving electrode group GDL(i) includes nine driving electrodes DL(j−4) to DL(j+4). The previous stage driving electrode group GDL(i−1) of the driving electrode group GDL(i) includes nine driving electrodes DL(j−9) to DL(j−1). In addition, the next stage driving electrode group GDL(i+1) of the driving electrode group GDL(i) includes nine driving electrodes DL(j+1) to DL(j+9). As above, in the continuous driving electrode groups GDL(i−1) and GDL(i), the four driving electrodes DL(j−4) and DL(j−1) overlap each other which are located further toward the rear side than the driving electrode DL(j−5) located at the center of the driving electrode group GDL(i−1) and are located further toward the front side than the driving electrode DL(j) located at the center of the driving electrode group GDL(i). Similarly, in the continuous driving electrode groups GDL(i) and GDL(i+1), the four driving electrodes DL(j+1) and DL(j+4) overlap each other which are located further toward the rear side than the driving electrode DL(j) located at the center of the driving electrode group GDL(i) and are located further toward the front side than the driving electrode DL(j+5) located at the center of the driving electrode group GDL(i+1).

As shown in FIG. 19, the frontmost stage driving electrode group GDL(1) includes nine driving electrodes DL(1) to DL(9). In the driving electrode DL(1) and the next stage driving electrode DL(2), the four driving electrodes DL(6) to DL(9) overlap each other which are located further toward the rear side than the driving electrode DL(5) located at the center of the driving electrode group GDL(1) and are located further toward the front side than the driving electrode DL(10) located at the center of the driving electrode group GDL(2). The four driving electrodes DL(1) and DL(4) which are located further toward the front side than the driving electrode DL(5) located at the center of the driving electrode group GDL(1) do not overlap other driving electrode groups GDL. In addition, as shown in FIG. 20, the last stage driving electrode group GDL(K) includes nine driving electrodes DL(M−8) to DL(M). In the driving electrode group GDL(K) and the previous stage driving electrode group GDL(K−1), the four driving electrodes DL(M−8) to DL(M−5) overlap each other which are located further toward the front side than the driving electrode DL(M−4) located at the center of the driving electrode group GDL(K) and are located further toward the rear side than the driving electrode DL(M−9) located at the center of the driving electrode group GDL(K−1). The four driving electrodes DL(M−3) and DL(M) which are located further toward the rear side than the driving electrode DL(M−4) located at the center of the driving electrode group GDL(K) do not overlap other driving electrode groups GDL.

A first changeover terminal of each of the changeover switches SW(1) to SW(K) is connected to a wire to which the burst clock signal BCK is given as shown in FIGS. 18 to 20. The ground potential is given to a second changeover terminal of each of the changeover switches SW(1) to SW(K). In addition, a fixed potential lower than the burst clock signal BCK may be given to the second changeover terminal instead of the ground potential. A changeover between the first changeover terminal and the second changeover terminal in each of the changeover switches SW(1) to SW(K) is controlled based on each of the shift output signals SOUT(1) to SOUT(K). When the shift output signals SOUT(1) to SOUT(K) are in a high level, the changeover switches SW(1) to SW(K) respectively select the first changeover terminals, and when the shift output signals SOUT(1) to SOUT(K) are in a low level, the changeover switches SW(1) to SW(K) respectively select the second changeover terminals.

In the present embodiment, the driving electrodes DL adjacent to each other are connected to each other via a single resistive element Rd. A common terminal of each changeover switch SW is connected to the driving electrode DL located at the center of the driving electrode group GDL corresponding to the flip-flop FF which controls a changeover operation of the corresponding changeover switch, and is also connected to all the other driving electrodes DL via one or more resistive elements Rd. For example, the common terminal of the changeover switch SW(i) is connected to the driving electrode DL(j) located at the center of the driving electrode group GDL(i) corresponding to the flip-flop FF which controls a changeover operation of the corresponding changeover switch SW(i), and is also connected to all the other driving electrodes DL via one or more resistive elements Rd. In addition, the common terminal of the changeover switch SW(i) is connected to the driving electrodes DL(j−1) to DL(j−5), for example, via one to five resistive elements Rd. The common terminal of the previous stage changeover switch SW(i−1) of the changeover switch SW(i) is also connected to the driving electrode DL(j−5). Further, the common terminal of the changeover switch SW(i) is connected to the driving electrodes DL(j+1) to DL(j+5), for example, via one to five resistive elements Rd. The common terminal of the next stage changeover switch SW(i+1) of the changeover switch SW(i) is also connected to the driving electrode DL(j+5). As above, the driving electrode DL located at the center of each driving electrode group GDL and the driving electrodes DL located at the positions other than the center are connected to each other via one or more resistive elements Rd.

In addition, the driving electrodes DL located at the positions other than the center of each driving electrode group GDL and the driving electrodes DL other than the corresponding driving electrode DL are connected to each other via one or more resistive elements Rd. As shown in FIG. 18, the driving electrode DL(j−1) in the driving electrode group GDL(i) is connected to the driving electrodes DL(j−2) to DL(j−9), respectively, for example, via one to eight resistive elements Rd. Similarly, the driving electrode DL(j−1) is connected to the driving electrodes DL(j) to DL(j+9), respectively, for example, via one to ten resistive elements Rd.

In addition, as shown in FIG. 19, the wire connected to the (M+1) resistive elements Rd is grounded on the frontmost stage side. Similarly, as shown in FIG. 20, the wire connected to the (M+1) resistive elements Rd is grounded on the last stage side.

With the above-described configuration, the driving signal generation circuit 132 according to the present embodiment functions as a resistance division circuit which resistance-divides each shift output signal SOUT. An operation of the driving signal generation circuit 132 is the same as in the first embodiment, and thus description thereof will be omitted. In addition, in the driving signal generation circuit 132 according to the present embodiment, voltages of signals given to the driving electrodes DL(j−1) to DL(j−3) are respectively $4/5$, $3/5$, $2/5$, and $1/5$ of a voltage of a driving signal given to the driving electrode DL(j). In other words, in the driving circuit 130 including the driving signal generation circuit 132 according to the present embodiment, as the driving electrode DL to which a voltage is to be applied in each selection period is located at a position more distant from the center of the driving electrode group GDL(i) including the driving electrode DL, nine driving signals of which voltages linearly decrease are generated and are respectively applied to the nine driving electrodes DL. In addition, four driving electrodes DL are driven so as to overlap each other in the continuous selection periods.

Figure 21:
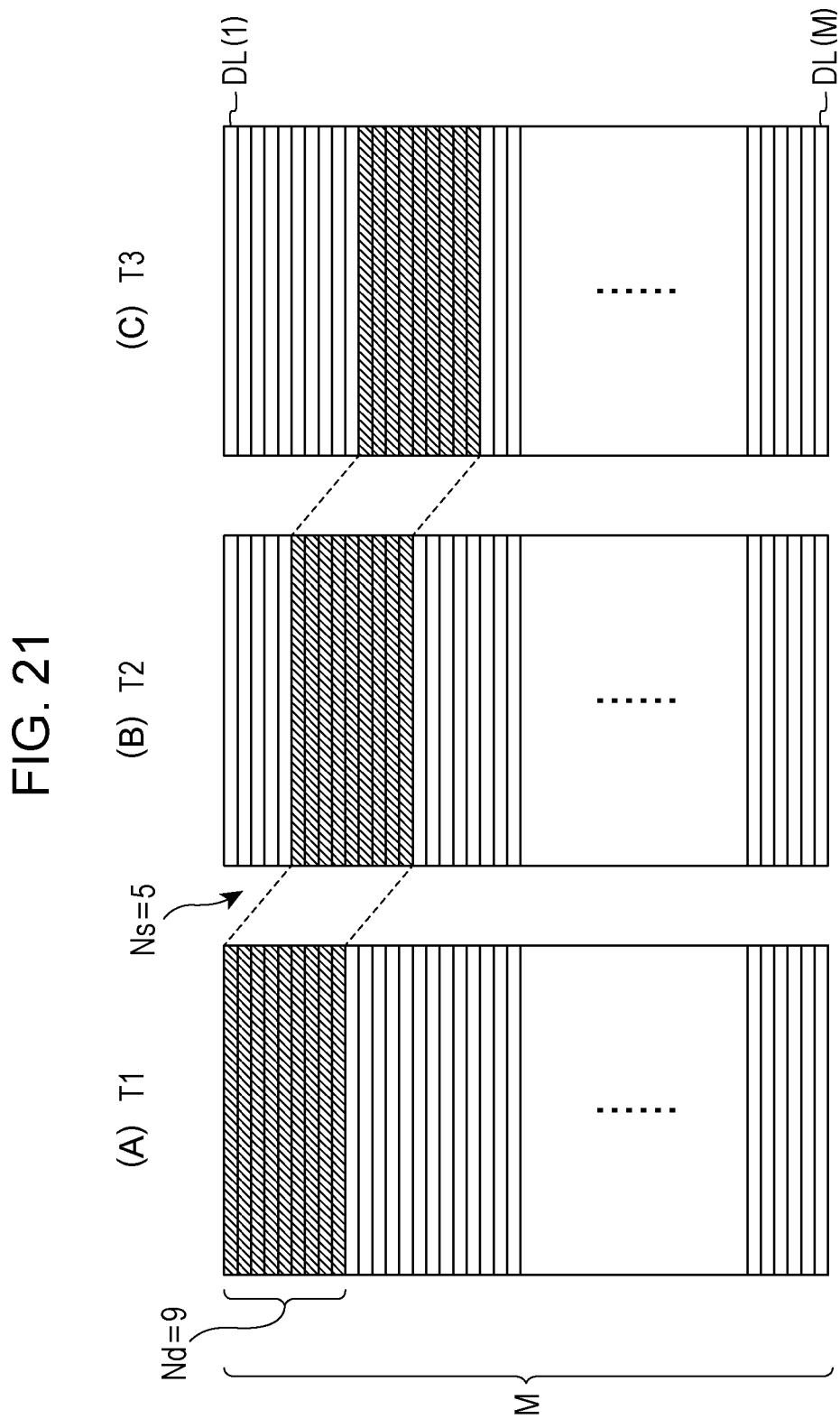
[FIG. 21]

FIGS. 21(A) to 21(C) are plan views illustrating a transition state of the driving electrodes DL which are driven in the present embodiment. As shown in FIGS. 21(A) to 21(C), in the present embodiment, the simultaneously driven number Nd is 9 (=2×m−1), and the shift number Ns is 5 (=m). As above, the number of driving electrodes DL increases more than in the first embodiment, and thus both the driven number Nd and the shift number Ns increase. Therefore, even in a case of improving detection accuracy by decreasing the width of the driving electrode DL, a sufficient S/N ratio can be secured by increasing the driven number Nd, and a driving frequency can be maintained by increasing the shift number Ns.

<2.2 Effects>

According to the present embodiment, since the number of driving electrodes DL increases, and the width of each driving electrode DL is reduced, it is possible to further improve detection accuracy than in the first embodiment.

<3. Third Embodiment>

The third embodiment of the present invention has the same configuration as the first embodiment except for an arrangement of the driving circuit 130. In addition, among constituent elements of the present embodiment, the same constituent element as in the first embodiment is given the same reference numeral, and description thereof will be omitted.

<3.1 Arrangement of Driving Circuit>

Figure 22:
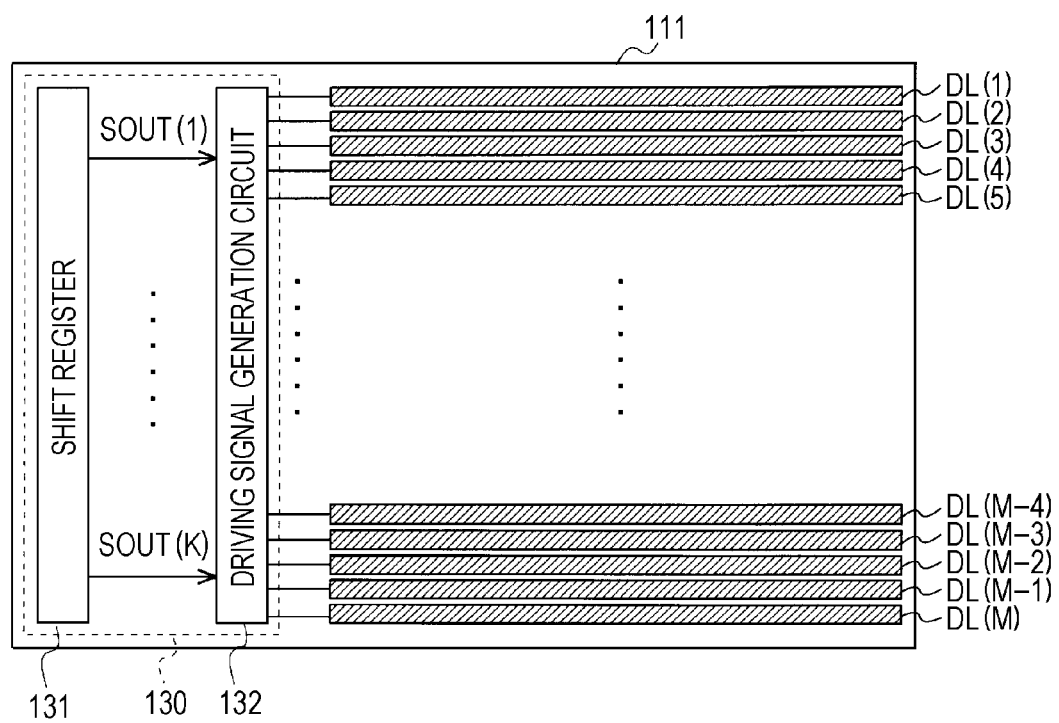
[FIG. 22]

FIG. 22 is a block diagram illustrating a partial configuration of a touch panel 110 according to the present embodiment. In the present embodiment, the driving circuit 130 is integrally formed with the touch panel 110. In other words, the driving circuit 130 is monolithically implemented on the surface of the first insulating substrate 111 on which the M driving electrodes DL(1) to DL(M) are disposed as shown in FIG. 22. The driving circuit 130 is implemented using amorphous silicon, microcrystalline silicon, an oxide semiconductor, or the like. A configuration and an operation of the driving circuit 130 according to the present embodiment are the same as in the first embodiment, and thus description thereof will be omitted. In addition, the touch panel controller TPC according to the present embodiment includes the detection circuit group 140 and the control unit 150.

<3.2 Effects>

According to the present embodiment, the driving circuit 130 is monolithically implemented, and thus it is possible to reduce the number of wires. In addition, a wire is shortened so as to reduce wire resistance, and thus a CR time constant of the driving electrode DL is reduced. Therefore, it is possible to perform driving at high speed. Further, wires are not disposed in a frame region, and thus it is possible to reduce the frame region.

<4. Fourth Embodiment>

The fourth embodiment of the present invention has the same configuration as the first embodiment except for the driving signal generation circuit 132. In addition, among constituent elements of the present embodiment, the same constituent element as in the first embodiment is given the same reference numeral, and description thereof will be omitted.

<4.1 Configuration and Operation of Driving Signal Generation Circuit>

Figure 23:
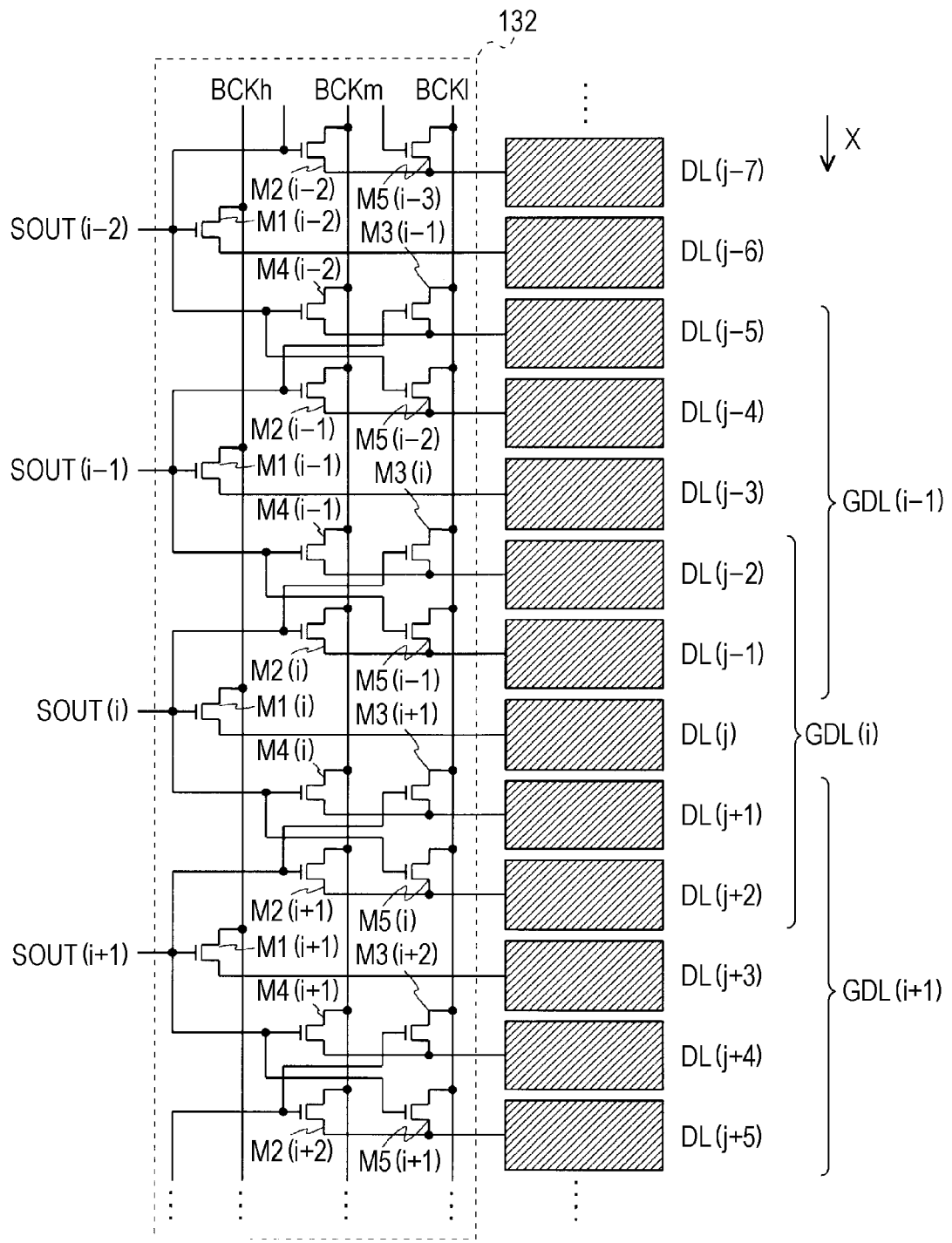
[FIG. 23]
Figure 24:
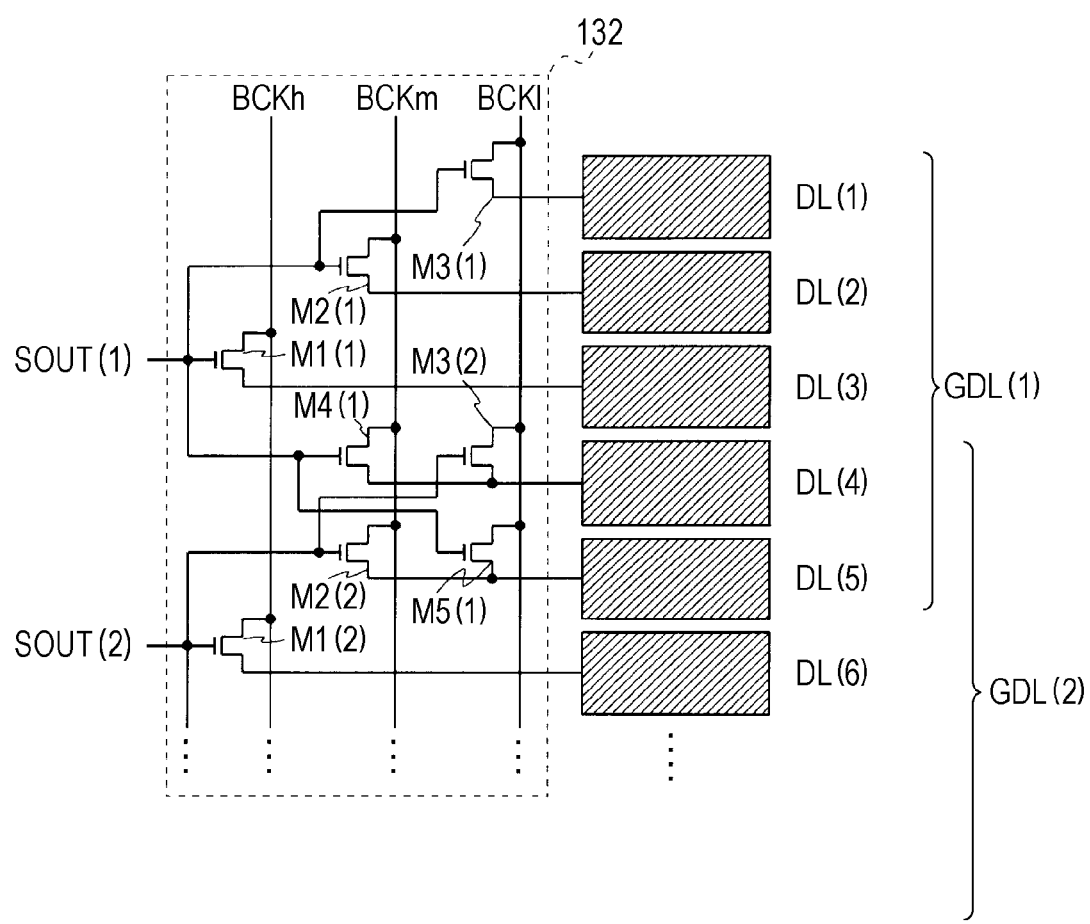
[FIG. 24]
Figure 25:
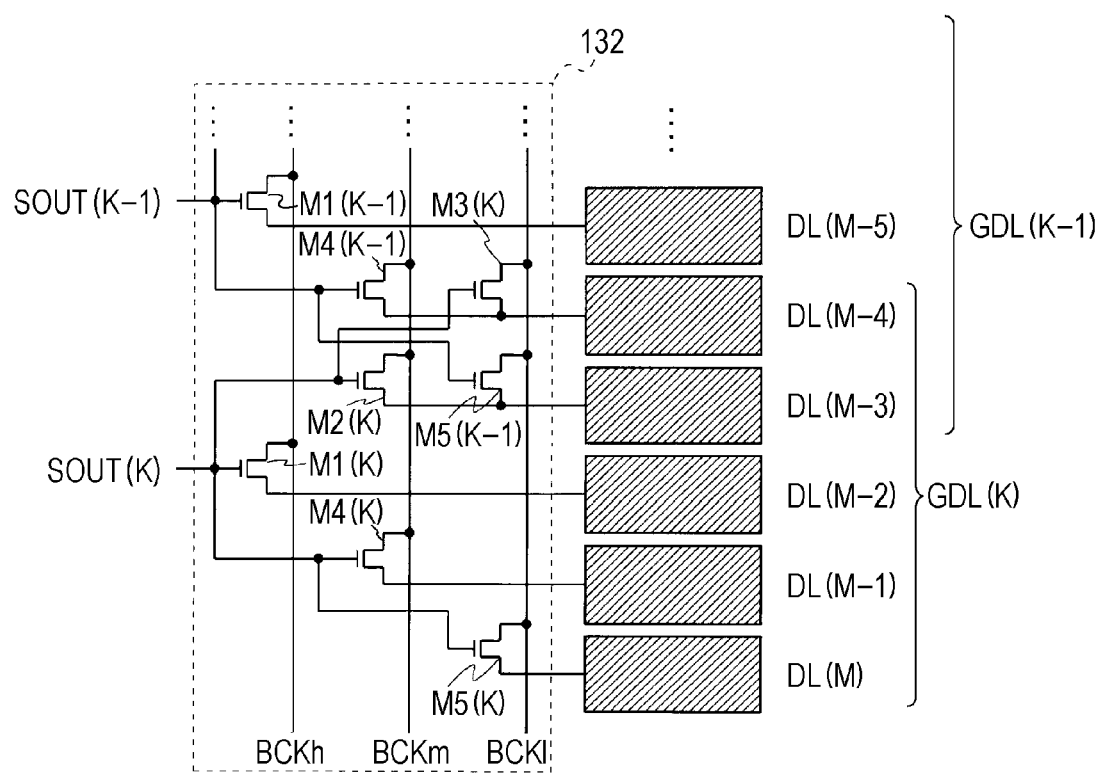
[FIG. 25]

FIG. 23 is a block diagram illustrating a configuration of a driving signal generation circuit 132 and a connection relationship between the driving signal generation circuit 132 and driving electrodes DL. The arrow in the figure indicates the X direction. FIG. 24 is a block diagram illustrating a configuration of a frontmost stage side of the driving signal generation circuit 132 according to the present embodiment and a connection relationship between the frontmost stage side of the driving signal generation circuit 132 and a frontmost stage side of the driving electrodes DL. FIG. 25 is a block diagram illustrating configuration of a last stage side of the driving signal generation circuit 132 according to the present embodiment and a connection relationship between the last stage side of the driving signal generation circuit 132 and a last stage side of the driving electrodes DL. As shown in FIGS. 23 to 25, the driving signal generation circuit 132 according to the present embodiment includes thin film transistors M1(1) to M1(K), M2(1) to M2(K), M3(1) to M3(K), M4(1) to M4(K), and M5(1) to M5(K). In addition, a configuration of each driving electrode group GDL and a method in which the driving electrode groups GDL adjacent to each other in the X direction are made to overlap each other are the same as in the first embodiment, and thus description thereof will be omitted.

In the present embodiment, a single flip-flop FF (the shift output signal SOUT) corresponds to a plurality of thin film transistors. In other words, as shown in FIGS. 23 to 25, except for the frontmost stage side and the last stage side, a single flip-flop FF (the shift output signal SOUT) corresponds to five thin film transistors. For example, the flip-flop FF(i) which outputs the shift output signal SOUT(i) corresponds to five thin film transistors M1(i), M2(i), M3(i), M4(i), and M5(i).

Gate terminals of the thin film transistors M1(1) to M1(K) are respectively connected to the output terminals of the flip-flops FF(1) to FF(K) as shown in FIGS. 23 to 25. Similarly, gate terminals of the thin film transistors M2(1) to M2(K) are also respectively connected to the output terminals of the flip-flops FF(1) to FF(K). Similarly, gate terminals of the thin film transistors M3(1) to M3(K) are also respectively connected to the output terminals of the flip-flops FF(1) to FF(K). Similarly, gate terminals of the thin film transistors M4(1) to M4(K) are also respectively connected to the output terminals of the flip-flops FF(1) to FF(K). Similarly, gate terminals of the thin film transistors M5(1) to M5(K) are also respectively connected to the output terminals of the flip-flops FF(1) to FF(K).

A source terminal which is one of conduction terminals of each of the thin film transistors M1(1) to M1(K) is connected to a wire to which a burst clock signal (hereinafter, referred to as a "high burst clock signal") BCKh with a predetermined voltage is given as shown in FIGS. 23 to 25. A source terminal which is one of conduction terminals of each of the thin film transistors M2(1) to M2(K) is connected to a wire to which a burst clock signal (hereinafter, referred to as a "middle burst clock signal") BCKm with a voltage which is ⅔ of a voltage of the high burst clock signal BCKh is given. In addition, similarly, a source terminal which is one of conduction terminals of each of the thin film transistors M4(1) to M4(K) is also connected to the wire to which the middle burst clock signal BCKm is given. A source terminal which is one of conduction terminals of each of the thin film transistors M3(1) to M3(K) is connected to a wire to which a burst clock signal (hereinafter, referred to as a "low burst clock signal") BCKl with a voltage which is ⅓ of a voltage of the high burst clock signal BCKh is given. Further, similarly, a source terminal which is one of conduction terminals of each of the thin film transistors M5(1) to M5(K) is also connected to the wire to which the low burst clock signal BCKl is given.

A drain terminal which is the other conduction terminal of each of the thin film transistors M1(1) to M1(K) is connected to the driving electrode DL located at the center of the corresponding driving electrode group GDL as shown in FIGS. 23 to 25. For example, the drain terminal of the thin film transistor M1(i) is connected to the driving electrode DL(j) located at the center of the corresponding driving electrode group GDL(i). As above, the driving electrode DL located at the center of each driving electrode group GDL is connected to the drain terminal of the thin film transistor of which the source terminal is connected to the wire to which the high burst clock signal BCKh is given.

A drain terminal which is the other conduction terminal of each of the thin film transistors M2(1) to M2(K) is connected to the previous stage driving electrode DL of the driving electrode group GDL located at the center of the corresponding driving electrode group GDL as shown in FIGS. 23 to 25. For example, the drain terminal of the thin film transistor M2(i) is connected to the previous stage driving electrode DL(j−1) of the driving electrode DL(j) located at the center of the corresponding driving electrode group GDL(i).

A drain terminal which is the other conduction terminal of each of the thin film transistors M3(1) to M3(K) is connected to the second previous stage driving electrode DL of the driving electrode group GDL located at the center of the corresponding driving electrode group GDL as shown in FIGS. 23 to 25. For example, the drain terminal of the thin film transistor M3(i) is connected to the second previous stage driving electrode DL(j−2) of the driving electrode DL(j) located at the center of the corresponding driving electrode group GDL(i).

Each of the thin film transistors M4(1) to M4(K) is connected to the next stage driving electrode DL of the driving electrode group GDL located at the center of the corresponding driving electrode group GDL as shown in FIGS. 23 to 25. For example, the drain terminal of the thin film transistor M4(i) is connected to the next stage driving electrode DL(j+1) of the driving electrode DL(j) located at the center of the corresponding driving electrode group GDL(i).

A drain terminal which is the other conduction terminal of each of the thin film transistors M5(1) to M5(K) is connected to the second next stage driving electrode DL of the driving electrode group GDL located at the center of the corresponding driving electrode group GDL as shown in FIGS. 23 to 25. For example, the drain terminal of the thin film transistor M5(i) is connected to the second next stage driving electrode DL(j+2) of the driving electrode DL(j) located at the center of the corresponding driving electrode group GDL(i).

With the above-described configuration, a voltage of the burst clock signal BCK given to the source terminal of the thin film transistor of which the drain terminal is connected to the driving electrode DL linearly decreases as the driving electrode DL is located at a position more distant from the center of the driving electrode group GDL(i) including the corresponding driving electrode DL.

Figure 26:
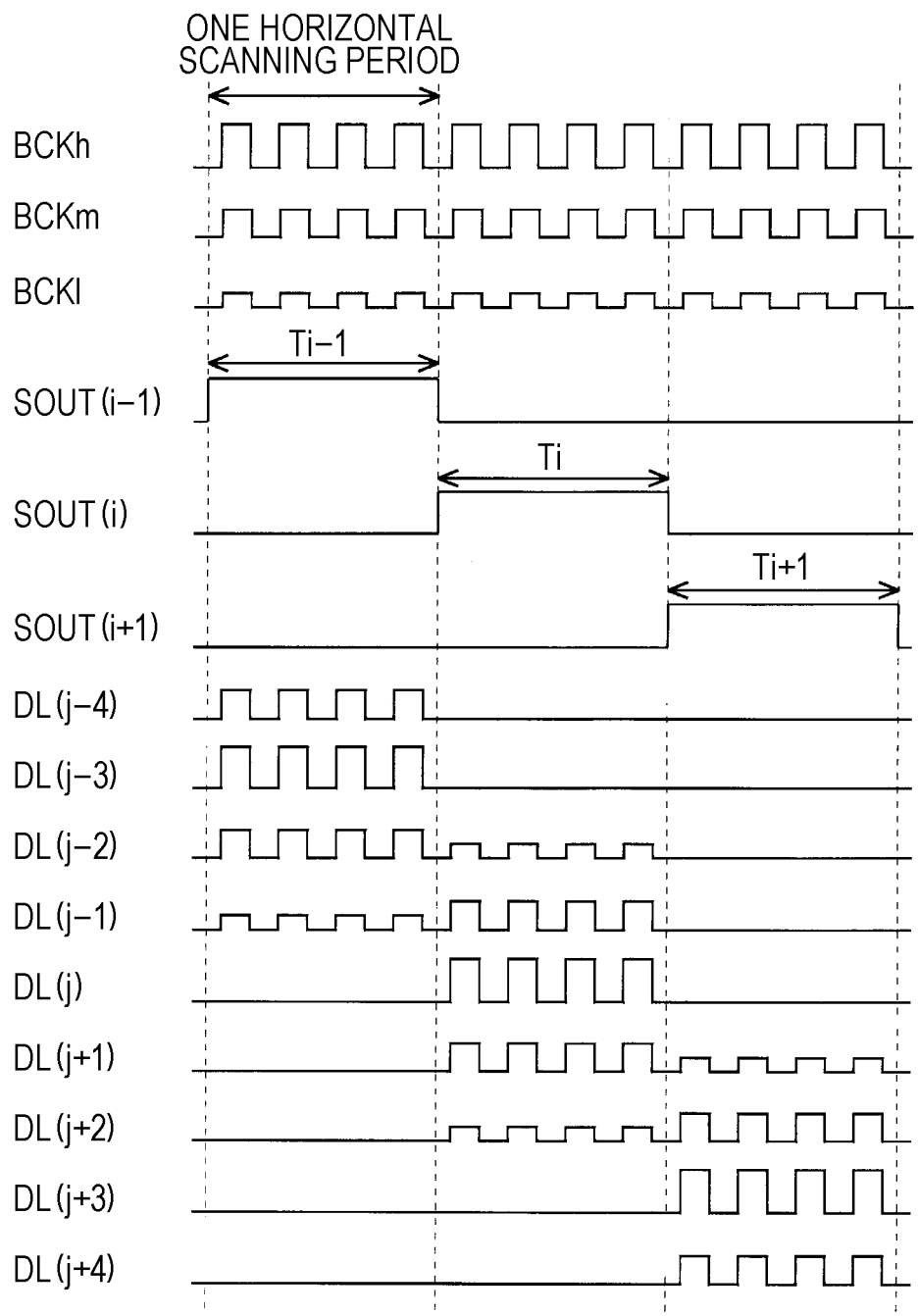
[FIG. 26]

FIG. 26 is a signal waveform diagram illustrating an operation of the driving signal generation circuit 132 according to the present embodiment. As shown in FIG. 26, a duration of the cycle of each of the high burst clock signal BCKh, the middle burst clock signal BCKm, and the low burst clock signal BCK1 is ⅛ of a duration of the cycle of each of the above-described first drive clock signal DCK1 and second drive clock signal DCK2. Each of the high burst clock signal BCKh, the middle burst clock signal BCKm, and the low burst clock signal BCK1 includes four pulses in one horizontal scanning period.

When a selection period is Ti, in other words, when the shift output signal SOUT(i) is in a high level, the previous stage shift output signal SOUT(i−1) and the next stage shift output signal SOUT(i+1) of the shift output signal SOUT(i) are in a low level. At this time, the thin film transistors M1(i), M2(i), M3(i), M4(i) and M5(i) of which the shift output signal SOUT(i) is given to the gate terminals are turned to a conduction state. In addition, the high burst clock signal BCKh of one horizontal period is applied to the driving electrode DL(j) connected to the drain terminal of the thin film transistor M1(i) as a driving signal. Further, the middle burst clock signal BCKm of one horizontal period is applied to the driving electrodes DL(j−1) and DL(j+1) respectively connected to the drain terminals of the thin film transistors M2(i) and M4(i) as a driving signal. Furthermore, the low burst clock signal BCK1 of one horizontal period is applied to the driving electrodes DL(j−2) and DL(j+2) respectively connected to the drain terminals of the thin film transistors M3(i) and M5(i) as a driving signal. In this way, a voltage of the driving signal to be applied to the corresponding driving electrode DL linearly decreases as the driving electrode DL forming the driving electrode group GDL(i) is located at a position more distant from the center of the driving electrode group GDL(i).

In addition, also in the next selection period Ti+1 when the shift output signal SOUT(i+1) is in a high level, the same operation is performed. As shown in FIG. 26, in the selection period when the shift output signal SOUT(i) is in a high level and the selection period when the shift output signal SOUT(i+1) is in a high level, two driving electrodes DL(j+1) and DL(j+2) are driven in an overlapping manner.

As described above, in the driving circuit 130 including the driving signal generation circuit 132 according to the present embodiment, as the driving electrode DL to which a voltage is to be applied in each selection period is located at a position more distant from the center of the driving electrode group GDL(i) including the corresponding driving electrode DL, five driving signals of which voltages linearly decrease are generated and are respectively applied to the five driving electrodes DL. In addition, two driving electrodes DL are driven so as to overlap each other in the continuous selection periods.

<4.2 Effects>

According to the present embodiment, the driving signal generation circuit 132 having a plurality of thin film transistors for a single flip-flop is used, and thus it is possible to achieve the same effect as in the first embodiment. In addition, according to the present embodiment, since driving signals to be applied to the driving electrodes DL(1) to DL(M) are generated based on operations of the thin film transistors M1(1) to M1(K), M2(1) to M2(K), M3(1) to M3(K), M4(1) to M4(K), and M5(1) to M5(K), it is possible to further reduce power consumption than in the first embodiment.

In addition, the driving circuit 130 according to the present embodiment may be implemented by an IC as in the first embodiment, or may be implemented by being integrally formed with the touch panel 110 as in the third embodiment. Further, although detection accuracy is reduced, there may be a configuration in which a voltage of the driving signal to be applied to the corresponding driving electrode DL nonlinearly decreases as the driving electrodes DL forming the driving electrode group GDL(i) is located at a position more distant from the center of the driving electrode group GDL(i). However, even in a case where a variation in a voltage of a driving signal is nonlinear in this way, detection accuracy corresponding to the number of driving electrodes DL can be obtained.

<5. Fifth Embodiment>

<5.1 Configuration of Liquid Crystal Display with Touch Input Device>

Figure 27:
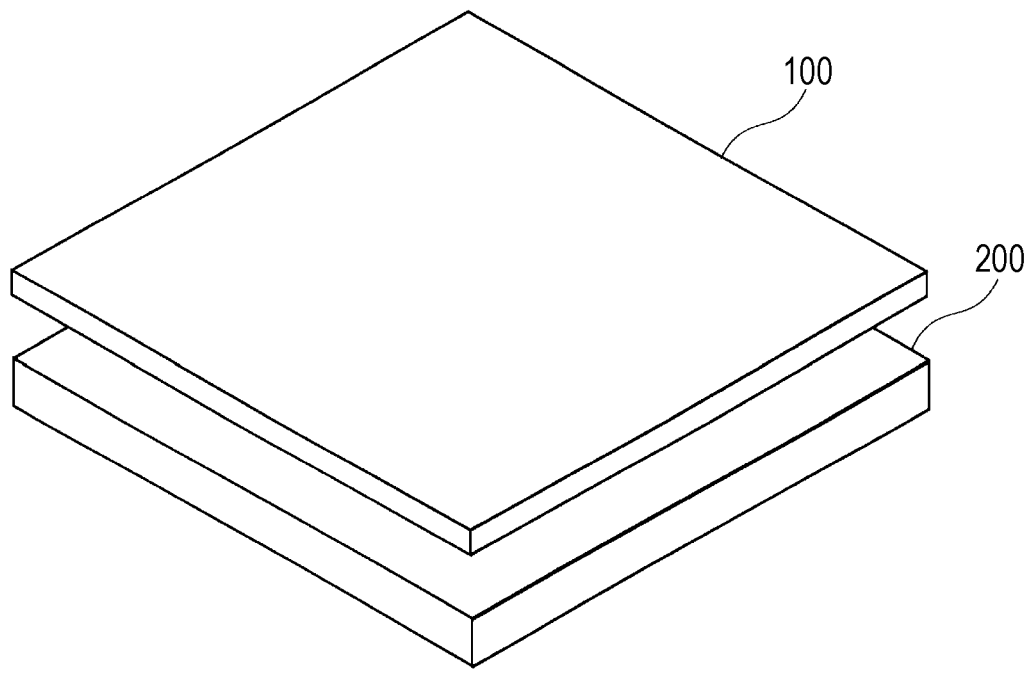
[FIG. 27]

FIG. 27 is an exploded perspective view illustrating a schematic configuration of a liquid crystal display with a touch input device according to the fifth embodiment of the present invention. As shown in FIG. 27, the liquid crystal display with a touch input device according to the present embodiment includes a touch input device 100, and a liquid crystal display 200 disposed on a back surface of the touch input device 100. The touch input device 100 may be related to any one of the first to fourth embodiments, and will be hereinafter described as being related to the first embodiment. In addition, a detailed description of the touch input device 100 will be omitted. Further, among constituent elements of the present embodiment, the same constituent element as in the first embodiment is given the same reference numeral, and description thereof will be omitted.

Figure 28:
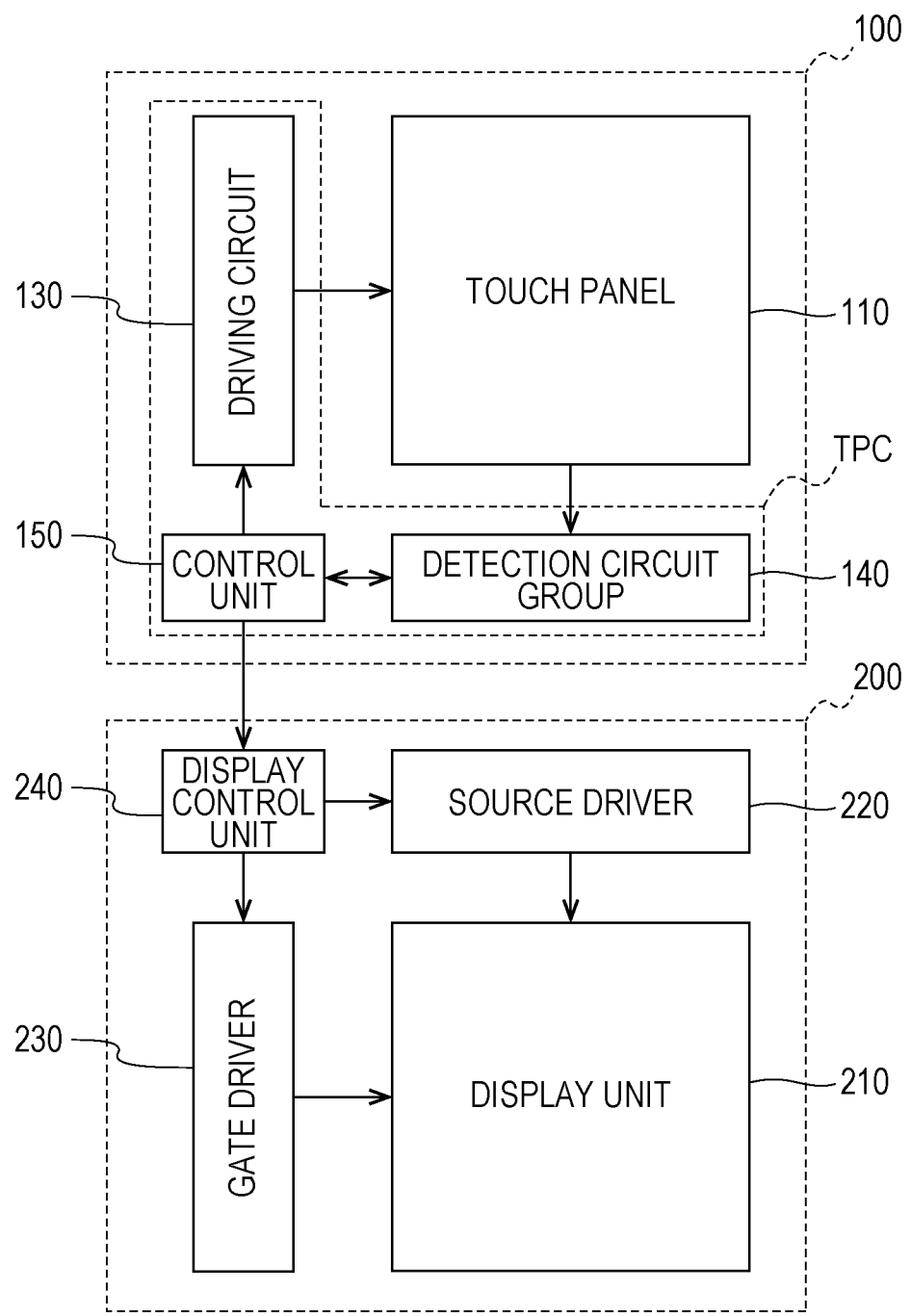
[FIG. 28]

FIG. 28 is a block diagram illustrating a schematic configuration of the liquid crystal display with a touch input device according to the present embodiment. As shown in FIG. 28, the touch input device 100 in the present embodiment includes a touch panel 110, and a touch panel controller TPC connected to the touch panel 110. The touch panel controller TPC includes a driving circuit 130, a detection circuit group 140, and a control unit 150. The liquid crystal display 200 includes a display unit 210 for displaying an image, a source driver 220, a gate driver 230, and a display control unit 240.

The display unit 210 includes a pair of electrode substrates and a liquid crystal layer interposed therebetween, and polarization plates are attached to outer surfaces of the respective electrode substrates. One of the pair of electrode substrates is an active matrix type substrate which is called a TFT substrate. The TFT substrate includes a plurality of source lines and a plurality of gate lines disposed in a lattice form so as to intersect each other on an insulating substrate such as a glass substrate, TFTs and pixel electrodes disposed so as to correspond to respective intersections of the source lines and gate lines, and the like. The other of the pair of electrode substrates is called an opposed substrate, and includes an insulating substrate such as glass, a common electrode formed on the entire surface of the insulating substrate, and the like.

The display unit 210 and the touch panel 110 are disposed so as to face each other, and are adhered to each other using a transparent adhesive. In this case, the opposed substrate of the display unit 210 is adhered to the first insulating substrate 111 of the touch panel 110. As described above, in a case where the first insulating substrate 111 is not provided in the touch input device 100, the driving electrodes DL(1) to DL(M) of the touch input device 100 are disposed on the opposed substrate of the display unit 210, and the opposed substrate is adhered to the second insulating substrate of the touch input device 100 using the transparent adhesive 112. In addition, in this case, when the driving circuit 130 is monolithically implemented as described above, the driving circuit 130 is formed, for example, on the opposed substrate.

Coordinate data CD is given to the display control unit 240 from the control unit 150 of the touch input device 100. Based on the coordinate data CD and signals given from other external devices, the display control unit 240 outputs an image signal DV, a source start pulse signal SSP, a source clock signal SCK, a gate start pulse signal GSP, a gate clock signal GCK, and the like, as signals for displaying an image indicated by display data DAT on the display unit 210. The display control unit 240 is typically implemented by an IC.

The source driver 220 receives the image signal DV, the source start pulse signal SSP, the source clock signal SCK, and the like, output from the display control unit 240, and applies a plurality of source signals to a plurality of source lines, respectively. The source driver 220 is typically implemented by an IC.

The gate driver 230 receives the gate start pulse signal GSP, the gate clock signal GCK, and the like, output from the display control unit 240, sequentially selects a plurality of gate lines GL(1) to GL(m), and applies an active gate signal to the selected gate line. In addition, the gate driver 230 may be implemented by an IC using monocrystalline silicon, or may be monolithically implemented using amorphous silicon, microcrystalline silicon, an oxide semiconductor, or the like on the TFT substrate of the display unit 210.

In the above-described way, the source signal is applied to each source line, the gate signal is applied to each gate line, and thus a voltage corresponding to a potential difference between each pixel electrode and the common electrode is applied to the liquid crystal layer. As a result, an image based on the coordinate data CD and the like which are given to the display control unit 240 from the control unit 150 of the touch input device 100 is displayed on the display unit 210.

<5.2 Effects>

According to the present embodiment, it is possible to implement a liquid crystal display with a touch input device capable of improving detection accuracy without reducing a driving frequency and an S/N ratio.

<6. Others>

Figure 29:
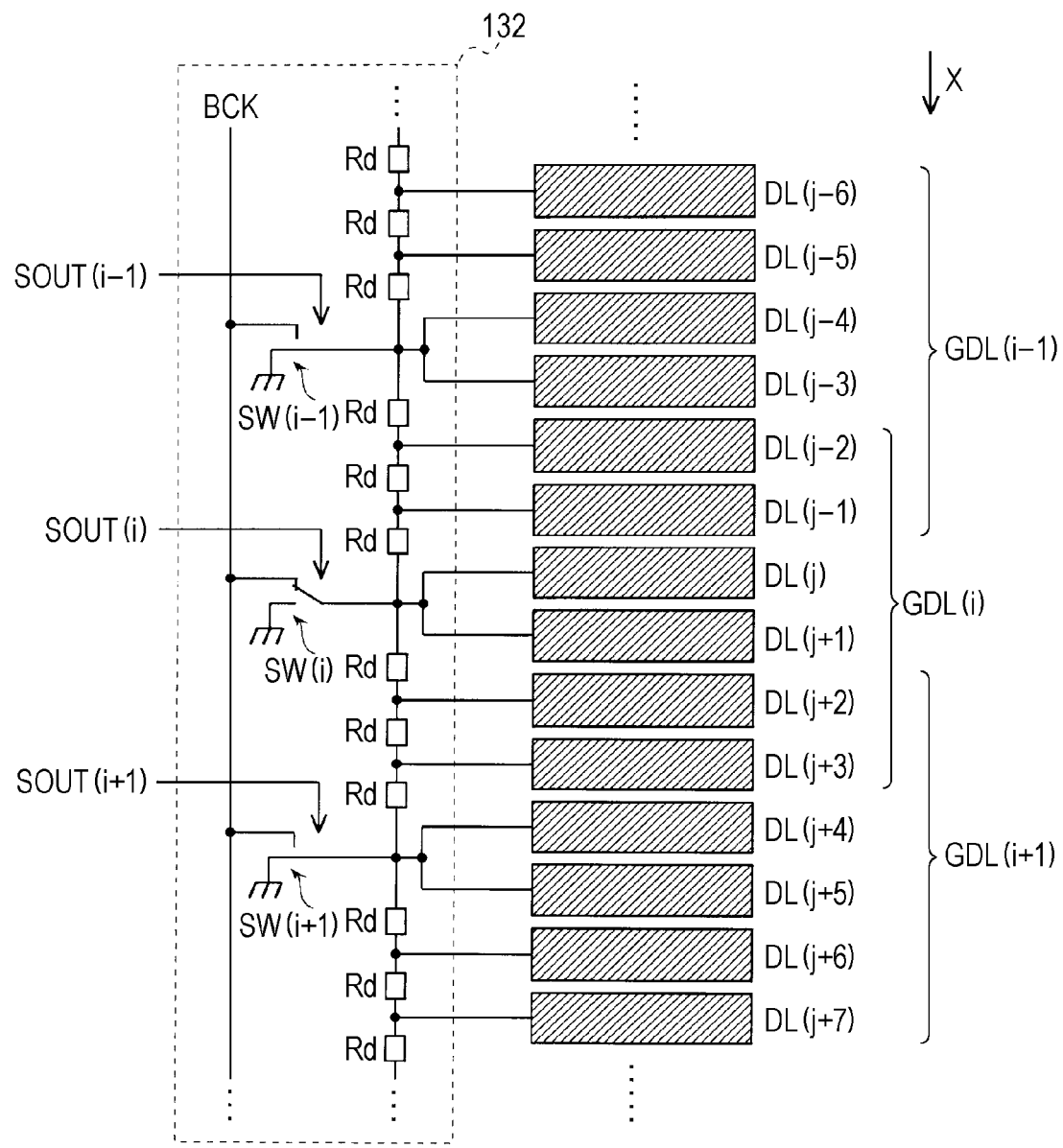
[FIG. 29]

As the simultaneously driven number Nd is 5 in the first and fourth embodiments, and the simultaneously driven number Nd is 9 in the second embodiment, the simultaneously driven number Nd is preferably an odd number of 3 or more in order to improve detection accuracy. However, the present invention is not limited thereto, and the simultaneously driven number Nd may be an even number of 4 or more. For example, as in an example shown in FIG. 29, the simultaneously driven number Nd may be six. As shown in FIG. 29, the driving electrode group GDL(i) includes six driving electrodes DL(j−2) to DL(j+3). Driving electrodes DL located at the center in the driving electrode group GDL(i) are two driving electrodes DL(j) and DL(j+1). In the driving electrode group GDL(i), two driving electrodes DL(j−2) and DL(j−1) overlap the previous stage driving electrode group GDL(i−1) of the corresponding driving electrode group GDL(i), and two driving electrodes DL(j+2) and DL(j+3) overlap the next stage driving electrode group GDL(i+1) of the corresponding driving electrode group GDL(i). The driving electrodes DL located at the center of each driving electrode group GDL are connected to the driving electrodes DL located at positions other than the center via one or more resistive elements Rd. In addition, the driving electrodes DL located at the positions other than the center of each driving electrode group GDL are connected to the driving electrodes DL other than the corresponding driving electrodes DL via one or more resistive elements. The two driving electrodes DL located at the center of each driving electrode group GDL are connected to each other without using the resistive element. The two driving electrodes DL located at the center are connected to a common terminal of a corresponding changeover switch SW. With the above-described configuration, as the driving electrode DL to which a voltage is to be applied in each selection period is located at a position more distant from the center of the driving electrode group GDL(i) including the corresponding driving electrode DL, six driving signals of which voltages linearly decrease are generated and are respectively applied to the six driving electrodes DL. In addition, two driving electrodes DL are driven so as to overlap each other in the continuous selection periods.

In a case where the simultaneously driven number Nd is an odd number, the simultaneously driven number is not limited to 5 and 9 described above. For example, the simultaneously driven number Nd may be 3, 7, 11, 13, 15, and the like.

Capacitance division may be performed by using a capacitor instead of the resistive element Rd in the first and second embodiments.

Although the liquid crystal display has been described as an example in the fifth embodiment, an organic electroluminescence (EL) display may be used instead of the liquid crystal display.

Although the electric charge transfer method is used as a method of measuring a detection voltage in the first embodiment, the present invention is not limited thereto. Therefore, a signal including a single pulse may be used as a driving signal instead of the burst signal as shown in the first, second and fourth embodiments. In addition, although the changeover switches SW(1) to SW(K) are provided in the driving signal generation circuit 132 in the first and second embodiments, a driving signal may be generated by resistance-dividing each of the shift output signals SOUT(1) to SOUT(K) without using them.

The present invention is applicable to so-called parallel driving, for example, disclosed in PTL 3. The number of pulses of a burst signal can be made to be multiples of a parallel number due to the parallel driving, and thus an S/N ratio can be increased.

In addition, the above-described respective embodiments may be performed in various modifications within the scope without departing from the spirit of the present invention.

As above, according to the present invention, it is possible to provide an input device capable of improving detection accuracy without reducing a driving frequency and an S/N ratio. In addition, according to the present invention, it is possible to provide a method of detecting a contact position of an object with a touch panel, capable of improving detection accuracy without reducing a driving frequency and an S/N ratio. Further, according to the present invention, it is possible to provide a display device of the input device capable of improving detection accuracy without reducing a driving frequency and an S/N ratio.

INDUSTRIAL APPLICABILITY

The present invention is applicable to a touch input device using a capacitive touch panel.

REFERENCE SIGNS LIST

100 Touch input device
110 Touch panel
130 Driving circuit
131 Shift register
132 Driving signal generation circuit
140 Detection circuit group
141(1) to 141(N) Detection circuit
150 Control unit
155 Coordinate acquisition portion
200 Liquid crystal display
210 Display unit
BCK Burst clock signal
BCKh High burst clock signal
BCKm Middle burst clock signal
BCKl Low burst clock signal
Cf Inter-electrode capacitor
DL(1) to DL(M) Driving electrode
GDL(1) to GDL(K) Driving electrode group
M1(1) to M1(K), M2(1) to M2(K), M3(1) to M3(K), M4(1) to M4(K), and M5(1) to M5(K) Thin film transistor (switching element)
Rd Resistive element
SL(1) to SL(N) Detection electrode
SW(1) to SW(K) Changeover switch
TPC Touch panel controller
Vd Variation voltage
Vs Detection voltage

The invention claimed is:

1. An input device comprising:
a touch panel that includes M (where M is a natural number of 5 or more) driving electrodes, and a plurality of detection electrodes forming capacitances between the respective driving electrodes, in which the M driving electrodes and the plurality of detection electrodes are perpendicular to each other and are disposed in a matrix;
a driving circuit that is connected to the M driving electrodes, sequentially drives the M driving electrodes for each predetermined selection period in the unit of a driving electrode group including continuous Nd (where 3≤Nd<M) driving electrodes, makes a driving electrode which is located further toward a rear side in a direction in which the M driving electrodes are arranged than a driving electrode located at a center of a driving electrode group which is driven in one selection period of continuous selection periods overlap a driving electrode which is located further toward a front side in the direction in which the M driving electrodes are arranged than a driving electrode located at a center of a driving electrode group which is driven in the other selection period, and reduces a voltage of a driving signal to be applied to a driving electrode as the driving electrode forming each driving electrode group is located at a position more distant from the center of the driving electrode group;
a plurality of detection circuits that are respectively connected to the plurality of detection electrodes and acquire detection voltages which respectively correspond to potentials of the plurality of detection electrodes; and
a control unit that is connected to the driving circuit and the plurality of detection circuits,
wherein the control unit includes a coordinate acquisition portion that acquires a coordinate of a position in which an object is in contact with the touch panel in the direction in which the M driving electrodes are arranged, based on a detection voltage acquired by the detection circuit in one of the continuous selection periods and a detection voltage acquired by the detection circuit in the other selection period.

2. The input device according to claim 1, wherein the driving circuit linearly reduces a voltage of a driving signal to be applied to a driving electrode as the driving electrode forming each driving electrode group is located at a position more distant from the center of the driving electrode group.

3. The input device according to claim 2, wherein the driving circuit includes:
a shift register provided with K (where K<M) bistable circuits which are longitudinally connected to each other, sequentially make output signals active, and correspond to the driving electrode groups different from each other; and
a driving signal generation circuit generating a driving signal which is applied to each driving electrode of a driving electrode group corresponding to a bistable circuit in response to an output signal from each bistable circuit.

4. The input device according to claim 3, wherein the driving signal generation circuit includes a plurality of resistive elements with the same resistance value as each other,
wherein a driving electrode located at the center of each driving electrode group is connected to driving electrodes located at positions other than the center of each driving electrode group via one or more resistive elements, and
wherein the driving electrodes located at the positions other than the center of each driving electrode group are connected to driving electrodes other than the corresponding driving electrodes via one or more resistive elements.

5. The input device according to claim 4, wherein driving electrodes adjacent to each other are connected to each other via the resistive element.

6. The input device according to claim 4, wherein the driving signal generation circuit includes K changeover switches that are respectively controlled so as to perform changeover operations on the basis of output signals from the K bistable circuits,
wherein a common terminal of each changeover switch is connected to a driving electrode located at the center of a driving electrode group corresponding to a bistable circuit which controls a changeover operation of the changeover switch,
wherein a predetermined signal is given to one of changeover terminals of each changeover switch, and
wherein a fixed potential is given to the other changeover terminal of each changeover switch.

7. The input device according to claim 3, wherein the driving signal generation circuit includes Nd switching elements of which control terminals are connected to the respective bistable circuits,
wherein one of a plurality of signals with different potentials is given to one of conduction terminals of each of the Nd switching elements,
wherein the other conduction terminals of the Nd switching elements are respectively connected to Nd driving electrodes of a driving electrode group corresponding to each bistable circuit, wherein a signal with the highest voltage of a plurality of signals with different voltages is given to one conduction terminal of a switching element of which the other conduction terminal is connected to a driving electrode located at the center of a driving electrode group corresponding to each bistable circuit, and wherein a voltage of a signal given to one conduction terminal of a switching element of which the other conduction terminal is connected to each driving electrode linearly decreases as the driving electrode is located at a position more distant from the center of a driving electrode group including the driving electrode.

8. The input device according to claim 1, wherein each driving electrode is formed so as to have a width of 1 mm to 2 mm.

9. The input device according to claim 1, wherein the driving circuit is integrally formed with the touch panel.

10. The input device according to claim 1, wherein the driving circuit is formed by a thin film transistor.

11. The input device according to claim 1, wherein the driving circuit is integrally formed with the control unit.

12. The input device according to claim 1, wherein Nd is an odd number.

13. A contact position detection method of detecting a position in which an object is in contact with a touch panel that includes M (where M is a natural number of 5 or more) driving electrodes, and a plurality of detection electrodes forming capacitances between the respective driving electrodes, in which the M driving electrodes and the plurality of detection electrodes are perpendicular to each other and are disposed in a matrix, the method comprising:

a step of sequentially driving the M driving electrodes for each predetermined selection period in the unit of a driving electrode group including continuous Nd (where 3≤Nd<M) driving electrodes, making a driving electrode which is located further toward a rear side in a direction in which the M driving electrodes are arranged than a driving electrode located at a center of a driving electrode group which is driven in one selection period of continuous selection periods overlap a driving electrode which is located further toward a front side in the direction in which the M driving electrodes are arranged than a driving electrode located at a center of a driving electrode group which is driven in the other selection period, and reducing a voltage of a driving signal to be applied to a driving electrode as the driving electrode forming each driving electrode group is located at a position more distant from the center of the driving electrode group;

a step of acquiring detection voltages which respectively correspond to potentials of the plurality of detection electrodes; and a step of acquiring a coordinate of a position in which the object is in contact with the touch panel in the direction in which the M driving electrodes are arranged, based on a detection voltage acquired in the step of acquiring detection voltages in one of the continuous selection periods and a detection voltage acquired in the step of acquiring detection voltages in the other selection period.

14. A display device comprising:
a display unit that displays an image; and
an input device,
wherein the input device includes
a touch panel that has M (where M is a natural number of 5 or more) driving electrodes, and a plurality of detection electrodes forming capacitances between the respective driving electrodes, in which the M driving electrodes and the plurality of detection electrodes are perpendicular to each other and are disposed in a matrix;
a driving circuit that is connected to the M driving electrodes, sequentially drives the M driving electrodes for each predetermined selection period in the unit of a driving electrode group including continuous Nd (where 3≤Nd<M) driving electrodes, makes a driving electrode which is located further toward a rear side in a direction in which the M driving electrodes are arranged than a driving electrode located at a center of a driving electrode group which is driven in one selection period of continuous selection periods overlap a driving electrode which is located further toward a front side in the direction in which the M driving electrodes are arranged than a driving electrode located at a center of a driving electrode group which is driven in the other selection period, and reduces a voltage of a driving signal to be applied to a driving electrode as the driving electrode forming each driving electrode group is located at a position more distant from the center of the driving electrode group;
a plurality of detection circuits that are respectively connected to the plurality of detection electrodes and acquire detection voltages which respectively correspond to potentials of the plurality of detection electrodes; and
a control unit that is connected to the driving circuit and the plurality of detection circuits,
wherein the control unit includes a coordinate acquisition portion that acquires a coordinate of a position in which an object is in contact with the touch panel in the direction in which the M driving electrodes are arranged, based on a detection voltage acquired by the detection circuit in one of the continuous selection periods and a detection voltage acquired by the detection circuit in the other selection period.

* * * * *